US011469693B2

(12) United States Patent
Kuo et al.

(10) Patent No.: US 11,469,693 B2
(45) Date of Patent: Oct. 11, 2022

(54) FAN DEVICE, FAN SYSTEM, AND CONTROL METHODS THEREOF

(71) Applicant: COOLER MASTER CO., LTD., New Taipei (TW)

(72) Inventors: Chu-Yi Kuo, New Taipei (TW); Chih-Hsuan Lu, New Taipei (TW); Wen-Hong Chen, New Taipei (TW); Chia-Hao Sung, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 281 days.

(21) Appl. No.: 17/020,583

(22) Filed: Sep. 14, 2020

(65) Prior Publication Data
US 2021/0265929 A1    Aug. 26, 2021

(30) Foreign Application Priority Data

Feb. 25, 2020 (TW) .................. 109106084

(51) Int. Cl.
*H02P 7/29* (2016.01)
*H05B 45/325* (2020.01)
(Continued)

(52) U.S. Cl.
CPC .............. *H02P 7/29* (2013.01); *F04D 27/004* (2013.01); *H05B 45/10* (2020.01); *H05B 45/325* (2020.01)

(58) Field of Classification Search
CPC .............. B01L 7/52; B01L 2300/1822; B01L 2300/1827; B01L 2300/0816; B01L 2300/021; B01L 2300/123; B01L 2400/0677; B01L 3/502715; B01L 2200/147; B01L 2200/16; B01L 2300/045; B01L 2300/087; B01L 2200/10; B01L 2400/0481; B01L 2300/0887; B01L 3/021; B01L 2200/025; B01L 2400/043; B01L 2300/0654; B01L 2300/044; B01L 2200/0647; B01L 3/5085; B01L 2300/042; B01L 3/0275; B01L 3/50273; B01L 3/50825; B01L 2200/0689; B01L 2200/0668; B01L 2300/0851; B01L 3/50851; B01L 2300/18; B01L 2300/022;
(Continued)

(56) References Cited

U.S. PATENT DOCUMENTS

2012/0227994 A1* 9/2012 Yang ..................... H02J 7/0013
173/217
2013/0278168 A1* 10/2013 Testani ................... H05B 39/04
315/250

* cited by examiner

*Primary Examiner* — Monica C King
(74) *Attorney, Agent, or Firm* — Maschoff Brennan

(57) ABSTRACT

A fan device comprises a processor, a fan motor and a light emitting element. The processor comprises an input terminal, a first and a second output terminals. An initial mode of the processor is in one of a rotation speed control mode and a light emission control mode. The input terminal is configured to receive an input instruction, and the input instruction comprises a first characteristic. The fan motor is electrically connected to the first output terminal, and the light emitting element is electrically connected to the second output terminal. When a value of the first characteristic is within a characteristic value range, the processor is switched from the initial mode to the other of the rotation speed control mode and the light emission control mode. When the value of the first characteristic is not within the characteristic value range, the initial mode of the processor is maintained.

21 Claims, 19 Drawing Sheets

(51) Int. Cl.
*H05B 45/10* (2020.01)
*F04D 27/00* (2006.01)

(58) Field of Classification Search
CPC .......... B01L 2200/0673; B01L 3/502; B01L 2300/046; B01L 2200/0642; B01L 2200/12; B01L 2200/14; B01L 2300/024; B01L 3/52; B01L 3/545; B01L 2400/0478; B01L 3/502761; B01L 3/505; B01L 2300/1805; B01L 9/527; B01L 7/525; B01L 2400/0487; B01L 2200/0621; B01L 2300/1883; B01L 2400/0457; B01L 2400/0655; B01L 2300/0681; B01L 2300/0867; B01L 2200/027; B01L 2400/0442; B01L 2200/148; B01L 3/502723; B01L 2300/1861; B01L 2400/0611; B01L 2400/0683; B01L 3/502738; B01L 9/06; B01L 3/5027; B01L 3/50855; B01L 3/502707; B01L 2300/1855; B01L 3/5082; B01L 9/52; B01L 9/543; B01L 2200/04; B01L 1/02; B01L 3/5025; B01L 2300/0663; B01L 2300/1894; B01L 2400/0409; B01L 2400/0436; B01L 2400/0439; B01L 2300/0858; B01L 2200/143; B01L 2300/023; B01L 2300/027; B01L 2300/14; B01L 2400/0496; B01L 3/5021; B01L 2200/028; B01L 2300/043; B01L 2300/0829; B01L 2200/0684; B01L 2200/142; B01L 3/08; B01L 3/50853; B01L 2400/0427; B01L 3/0217; B01L 3/0279; B01L 3/502792; B01L 2200/0631; B01L 2200/082; B01L 2200/141; B01L 3/523; B01L 2200/146; B01L 2300/0627; B01L 2300/168; B01L 2300/1838; B01L 2300/1844; B01L 2400/0666; B01L 2300/0672; B01L 2300/0864; B01L 2400/0605; B01L 2300/089; B01L 2200/023; B01L 2300/041; B01L 2300/0645; B01L 2300/0893; B01L 9/523; B01L 2200/026; B01L 2400/0415; B01L 2400/0406; B01L 2400/0424; B01L 2400/086; B01L 3/502784; B01L 2300/047; B01L 2300/0861; B01L 2300/0883; B01L 2400/0403; B01L 2400/0421; B01L 2400/0448; B01L 2400/0475; B01L 2400/082; B01L 3/0268; B01L 3/5457; B01L 7/00; B01L 2200/0636; B01L 2200/085; B01L 2300/0609; B01L 2300/0877; B01L 2300/165; B01L 3/502746; H02J 50/12; H02J 50/80; H02J 50/90; H02J 50/70; H02J 50/60; H02J 50/50; H02J 7/35; H02J 50/40; H02J 7/00; H02J 50/402; H02J 7/00304; H02J 9/02; H02J 2310/40; H02J 5/005; H02J 7/00034; H02J 7/0047; H02J 7/0048; H02J 3/00; H02J 7/345; H02J 7/0068; H02J 7/34; H02J 50/005; H02J 50/30; H02J 7/0013; H02J 50/20; H02J 7/0042; H02J 9/065; H02J 13/00007; H02J 7/00032; H02J 7/025; H02J 1/001; H02J 50/10; H02J 7/0029; H02J 7/007182; H02J 7/0063; H02J 1/102; H02J 7/00045; H02J 7/04; H02J 9/061; H02J 2310/48; H02J 50/15; H02J 7/0044; H02J 2300/28; H02J 50/001; H02J 7/00309; H02J 7/0069; H02J 50/05; H02J 7/00308; H02J 7/00712; H02J 1/106; H02J 7/0031; H02J 13/00017; H02J 50/502; H02J 7/00306; H02J 13/00006; H02J 2310/22; H02J 7/00302; H02J 7/0036; H02J 7/00714; H02J 7/007194; H02J 1/14; H02J 13/00; H02J 7/0045; H02J 9/062; H02J 2300/24; H02J 7/342; H02J 1/08; H02J 2310/14; H02J 3/14; H02J 3/381; H02J 7/0025; H02J 7/0071; H02J 2007/0067; H02J 2207/20; H02J 2310/23; H02J 2310/44; H02J 3/322; H02J 7/0016; H02J 7/0024; H02J 7/0086; H02J 7/02; H02J 9/00; H02J 13/00002; H02J 13/00016; H02J 13/00024; H02J 13/00026; H02J 13/00028; H02J 13/0017; H02J 7/00036; H02J 7/0049; H02J 7/007; H02J 7/007192; H02J 7/1423; H02J 7/24; H02J 1/082; H02J 2007/10; H02J 2207/40; H02J 3/02; H02J 50/23; H02J 7/00041; H02J 7/00711; H02J 7/007184; H02J 7/0091; H02J 7/06

See application file for complete search history.

FAN DEVICE, FAN SYSTEM, AND CONTROL METHODS THEREOF

CROSS-REFERENCE TO RELATED APPLICATIONS

This non-provisional application claims priority under 35 U.S.C. § 119(a) on Patent Application No(s). 109106084 filed in Republic of China on Feb. 25, 2020, the entire contents of which are hereby incorporated by reference.

BACKGROUND

1. Technical Field

This disclosure relates to a fan device, a fan system and control methods thereof, especially for a fan device, a fan system and control methods thereof, which are capable of controlling a rotation speed and a displaying state at any time.

2. Related Art

With respect to a fan, any one user not only requires a speed of the fan to comply with a required speed but also requires a displaying state of the fan to comply with a required displaying state, so a digital fan which can have various displaying states appears in the market.

There are first and second type digital fans in the current market, although the first type digital fan can have various displaying states, a combination of the brightness and the color of the first type digital fan is monotonous and the user can't freely control the combination of the brightness and the color at any time according to his demand. Therefore, the degree of freedom for controlling the first type digital fan is not enough. Although a combination of the brightness and the color of the second type digital fan is more plentiful, a hardware architecture of the second type digital fan is complex and the cost for manufacturing the second type digital fan is increased because the second type digital fan has a lot of micro controllers and a lot of signal lines.

Therefore, there is indeed a need for an improved fan device and a control method thereof, which can improve the above disadvantages.

SUMMARY

Accordingly, this disclosure provides a fan device, a fan system and control methods thereof, which can provide a plentiful displaying state. Moreover, anyone user can freely control a rotation speed of the fan device or the fan system and a displaying state of the fan device or the fan system at any time according to his demand, so the degree of freedom for controlling the fan device or the fan system is higher.

According to one or more embodiment of this disclosure, a fan device comprises a processor, a fan motor and a light emitting element. The processor comprises an input terminal, a first output terminal and a second output terminal. The processor has an initial mode, and the initial mode is in one of a rotation speed control mode and a light emission control mode. The input terminal is configured to receive an input instruction, and the input instruction comprises a first characteristic. The fan motor is electrically connected to the first output terminal, and the light emitting element is electrically connected to the second output terminal. When a value of the first characteristic is within a characteristic value range, the processor is switched from the initial mode to the other of the rotation speed control mode and the light emission control mode. When the value of the first characteristic is not within the characteristic value range and the initial mode is in the rotation speed control mode, the input terminal of the processor is electrically connected to the first output terminal. When the value of the first characteristic is not within the characteristic value range and the initial mode is in the light emission control mode, the input terminal of the processor is electrically connected to the second output terminal.

According to one or more embodiment of this disclosure, a control method of a fan device comprises: receiving an input instruction via an input terminal of a processor, wherein the processor has an initial mode, the initial mode is in one of a rotation speed control mode and a light emission control mode, the input instruction comprises a first characteristic; determining whether a value of the first characteristic is within a characteristic value range via the processor; switching the processor from the initial mode to the other of the rotation speed control mode and the light emission control mode when the processor determines that the value of the first characteristic is within the characteristic value range; maintaining the initial mode of the processor in the rotation speed control mode and outputting a rotation speed control signal of the input instruction to a fan motor when the processor determines that the value of the first characteristic is not within the characteristic value range and the initial mode is in the rotation speed control mode; and maintaining the initial mode of the processor in the light emission control mode and outputting a light emission control signal of the input instruction to a light emitting element when the processor determines that the value of the first characteristic is not within the characteristic value range and the initial mode is in the light emission control mode.

According to one or more embodiment of this disclosure, a fan system comprises a motherboard, a processor, a fan motor and a light emitting element. The motherboard outputs an input instruction and the input instruction comprises a first characteristic. The processor comprises an input terminal, a first output terminal and a second output terminal, and the input terminal receives the input instruction from the motherboard. The processor has an initial mode, and the initial mode is in one of a rotation speed control mode and a light emission control mode. The fan motor is electrically connected to the first output terminal. The light emitting element is electrically connected to the second output terminal. The processor is switched from the initial mode to the other of the rotation speed control mode and the light emission control mode when a value of the first characteristic is within a characteristic value range. The input terminal of the processor is electrically connected to the first output terminal when the value of the first characteristic is not within the characteristic value range and the initial mode is in the rotation speed control mode. The input terminal of the processor is electrically connected to the second output terminal when the value of the first characteristic is not within the characteristic value range and the initial mode is in the light emission control mode.

According to one or more embodiment of this disclosure, a control method of a fan system, comprises: outputting an input instruction via a motherboard, wherein the input instruction comprises a first characteristic; receiving the input instruction via an input terminal of a processor, wherein the processor has an initial mode, the initial mode is in one of a rotation speed control mode and a light emission control mode, the input instruction comprises a first characteristic; determining whether a value of the first characteristic is within a characteristic value range via the processor; switching the processor from the initial mode to the other of the rotation speed control mode and the light emission control mode when the processor determines that the value of the first characteristic is within the characteristic value range; maintaining the initial mode of the processor in the rotation speed control mode and outputting a rotation speed control signal of the input instruction to a fan motor when the processor determines that the value of the first characteristic is not within the characteristic value range and the initial mode is in the rotation speed control mode; and maintaining the initial mode of the processor in the light emission control mode and outputting a light emission control signal of the input instruction to a light emitting element when the processor determines that the value of the first characteristic is not within the characteristic value range and the initial mode is in the light emission control mode.

In view of the above description, any user can control the rotation speed of the fan motor and the displaying state of the light emitting element at any time according to the demand of the user. Because the displaying state of the light emitting element is not limited to the rotation speed of the fan motor and is directly controlled by the input instruction which is transmitted form the motherboard, the light emitting element can provide various combinations of brightness and color. Furthermore, the input terminal of the processor is directly used to receive the input instruction from the motherboard for proceeding subsequent controls of the fan motor and light emitting element without changing an overall hardware architecture of the fan device or the fan system, which can avoid the complexity of the overall hardware architecture as well as the increase in manufacture cost.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
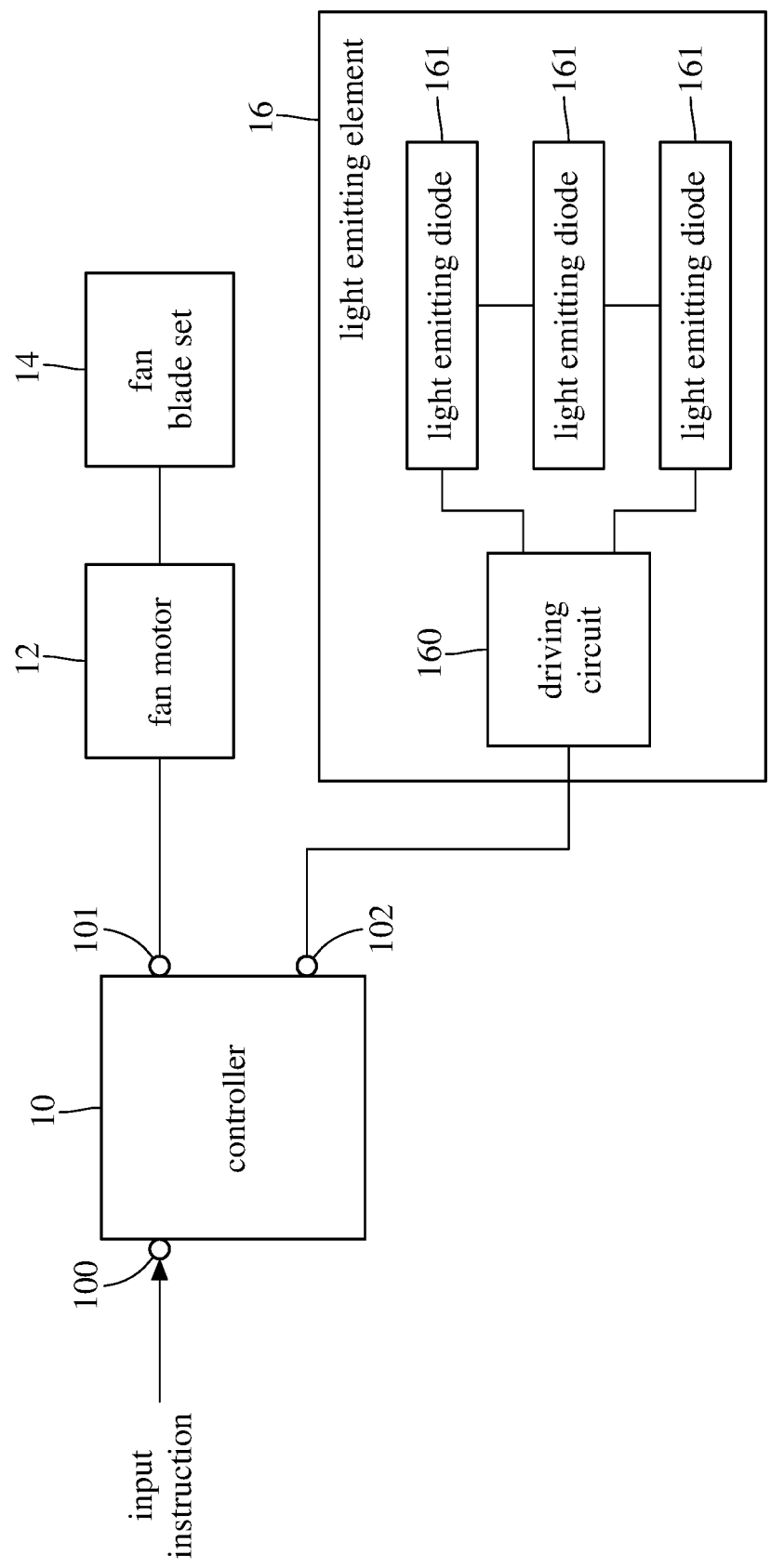
FIG. 1 is a block diagram of a fan device according to a first embodiment of the present disclosure.

FIG. 1 is a block diagram of a fan device according to a first embodiment of the present disclosure. As shown in FIG. 1, the fan device comprises a processor. In this embodiment, the processor is a controller 10. In addition to the controller 10, the fan device further comprises a fan motor 12, a fan blade set 14, and a light emitting element 16. The controller 10 comprises an input terminal 100, a first output terminal 101 and a second output terminal 102. The input terminal 100 of the controller 10 is configured to receive an input instruction, wherein the input instruction comprises a first characteristic. The fan motor 12 is electrically connected to the first output terminal 101 of the controller 10, and the fan blade set 14 is connected to the fan motor 12. The light emitting element 16 comprises a driving circuit 160 and a plurality of light emitting diodes 161. The driving circuit 160 is electrically connected to the second output terminal 102 of the controller 10 and the plurality of light emitting diodes 161. The controller 10 has an initial mode, and the initial mode of the controller 10 is in one of a rotation speed control mode and a light emission control mode. The controller 10 further stores a characteristic value range, and the characteristic value range is from a lower limit to an upper limit. For example, the first characteristic may be in a frequency or in a voltage. When a value of the first characteristic is within the characteristic vale range, the controller 10 is switched from the initial mode to the other of the rotation speed control mode and the light emission control mode. However, when the value of the first characteristic is not within the characteristic value range and the initial mode is in the rotation speed control mode, the input terminal 100 of the controller 10 is electrically connected to the first output terminal 101. When the value of the first characteristic is not within the characteristic value range and the initial mode is in a light emission control mode, the input terminal 100 of the controller 10 is electrically connected to the second output terminal 102. In the following descriptions, the initial mode is preset as the rotation speed control mode. However, in the other embodiment, the initial mode can also be preset as the light emission control mode, and the operation principle of the other embodiment is exactly the same as that of this embodiment.

With respect to an operation mechanism of the fan device according to the present disclosure, when the controller 10 is in the rotation speed control mode, it outputs a rotation speed control signal to drive the fan motor 12 to operate at a rotation speed. After the controller 10 is switched from the rotation speed control mode to the light emission control mode, the controller 10 continuously transmits a last rotation speed control signal to the fan motor 12, so that a rotation speed of the fan motor 12 is maintained at a last rotation speed according to the last rotation speed control signal.

Similarly, when the controller 10 is in the light emission control mode, it outputs a light emission control signal to drive each of the light emitting diodes 161 to be with a brightness and a color. After the controller 10 is switched from the light emission control mode to the rotation speed control mode, the driving circuit 160 continuously transmits a last light emission control signal to each of the light emitting diodes 161, so that the brightness of each of the light emitting diodes 161 and the color of each of the light emitting diodes 161 may be maintained at a last brightness and a last color according to the last light emission control signal.

Figure 2:
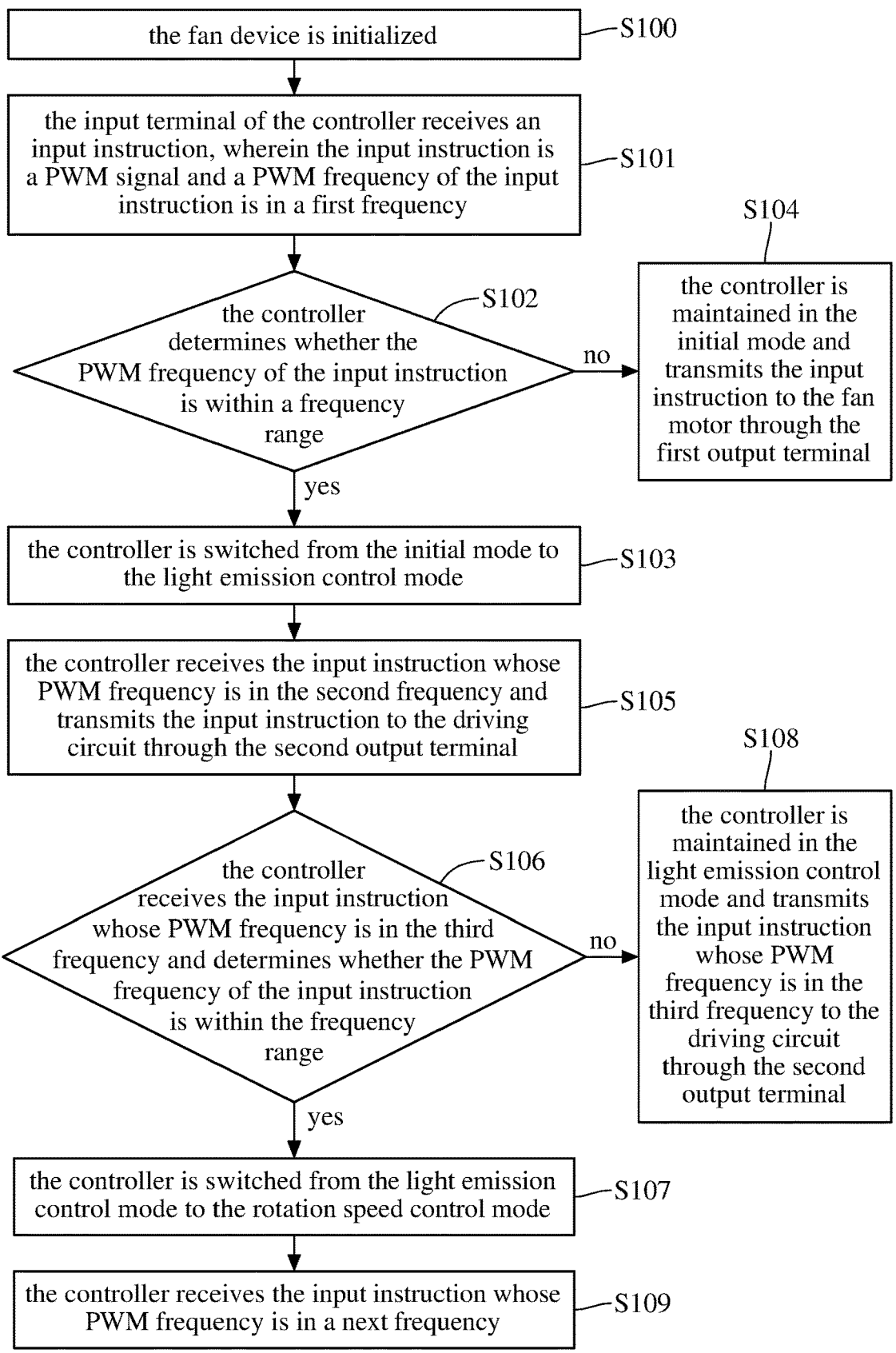
FIG. 2 is a flowchart of a control method of the fan device shown in FIG. 1 according to a first embodiment of the present disclosure.

FIG. 2 is a flowchart of a control method of the fan device shown in FIG. 1 according to a first embodiment of the present disclosure. As shown in FIG. 2, In a step S100 the fan device is initialized. After the fan device is initialized, the initial mode of the controller 10 is in the rotation speed control mode, an initial rotation speed of the fan motor 12 is at zero, and a displaying state of each of the light emitting diodes 161 is in darkness. In a step S101, the input terminal 100 of the controller 10 receives an input instruction, wherein the input instruction is a pulse width modulation (PWM) signal and a PWM frequency of the input instruction is in a first frequency. In a step S102, the controller 10 determines whether the PWM frequency of the input instruction is within a frequency range. When the controller 10 determines that the PWM frequency of the input instruction is within the frequency range, then a step S103 is performed. When the controller 10 determines that the frequency of the input instruction is not within the frequency range, then a step S104 is performed.

In the step S103, the controller 10 is switched from the initial mode to the light emission control mode. In the step S104, the controller 10 is maintained in the initial mode and transmits the input instruction to the fan motor 12 through the first output terminal 101, wherein a duty ratio of the input instruction is directly proportional to the rotation speed of the fan motor 12. In other embodiments, the duty ratio may also be inversely proportional to the rotation speed of the fan motor 12.

A step S105 is performed after the step S103. In the step S105, the PWM frequency of the input instruction is changed from the first frequency to a second frequency, wherein the second frequency is different from the first frequency. The controller 10 receives the input instruction whose PWM frequency is in the second frequency and transmits the input instruction to the driving circuit 160 through the second output terminal 102 in order to control the brightness of each of the light emitting diodes 161 and the color of each of the light emitting diodes 161. In this embodiment, the duty ratio of the input instruction is directly proportional to the brightness of each of the light emitting diodes 161. In other embodiment, the number of bytes of the input instruction may change the brightness of each of the light emitting diodes 161.

In a step S106, the PWM frequency of the input instruction is changed from the second frequency to a third frequency, wherein the third frequency is different from the second frequency. The controller 10 receives the input instruction whose PWM frequency is in the third frequency and determines whether the PWM frequency of the input instruction is within the frequency range. When the controller 10 determines that the PWM frequency of the input instruction is within the frequency range, then a step S107 is performed. When the controller 10 determines that the PWM frequency of the input instruction is not within the frequency range, then a step S108 is performed.

In the step S107, the controller is switched from the light emission control mode to the rotation speed control mode. In the step S108, the controller is maintained in the light emission control mode and transmits the input instruction whose PWM frequency is in the third frequency to the driving circuit 160 through the second output terminal 102.

A step S109 is performed after the step S107. In the step S109, the controller 10 receives the input instruction whose PWM frequency is in a next frequency.

With respect to the control of the brightness of the light emitting diode 161 and color of the light emitting diode 161 in the step S105, for example, the controller 10 transmits the PWM signal to the driving circuit 160 (e.g. Worldsemi, intelligent control LED integrated light source, serial type: WS2812), wherein there are twenty-four duty ratios in the PWM signal and the PWM signal presents a string of 24-bit data (G7~G0, R7~R0, B7~B0). In the above example, the string of 24-bit data evenly distributed among three primary colors (green, red, and blue colors); namely, there are 8 bits out of the 24-bit data for each primary color to use. When a first duty ratio of the PWM signal is set as 54%, a bit value is assigned as 1. When a second duty ratio of the PWM signal is set as 30%, a bit value is assigned as 0. When a third duty ratio of the PWM signal is set as 0%, a sequence is reset. In a first embodiment, when first to eighth duty ratios of the PWM signal are set as 54% respectively and ninth to twenty-fourth duty ratios of the PWM signal are set as 30% respectively, each of the light emitting diodes 161 emits a first red light with the highest brightness and a first part of the string of 24 bit data related to the red color is 11111111 and a second part of the string of 24-bit data related to the green color is 00000000 and a third part of the string of 24-bit data related to the blue color is 00000000. In a second embodiment, when each of the light emitting diodes 161 emits a second red light with 50% brightness, the first part of the string of 24-bit data related to the red color is 11110000, the second part of the string of 24-bit data related to the green color is 00000000, and the third part of the string of 24-bit data related to the blue color is 00000000. In a third embodiment, when each of the light emitting diodes 161 emits a yellow light with the highest brightness, the first part of the string of 24-bit data related to the red color is 11111111, the second part of the string of 24-bit data related to the green color is 11111111, and the third part of the string of 24-bit data related to the blue color is 00000000.

Figure 3A:
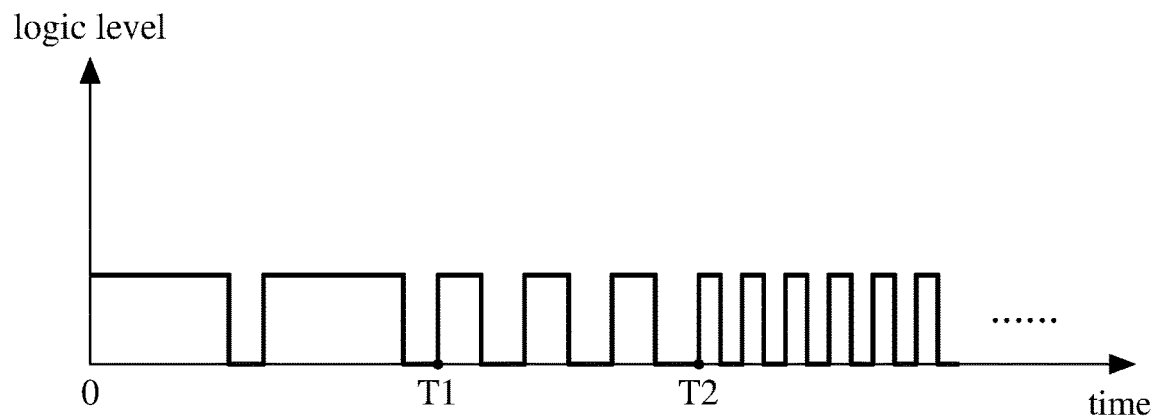
FIG. 3A is a timing diagram of an input instruction shown in FIG. 2 according to an embodiment of the present disclosure.

FIG. 3A is a timing diagram of the input instruction shown in FIG. 2 according to an embodiment of the present disclosure. As shown in FIG. 3A, the input instruction is a PWM signal. Before a first time point T1 of FIG. 3A, the controller 10 is in the rotation speed control mode, the PWM frequency of the PWM signal serving as the input instruction is a first frequency, and a first duty ratio of the PWM signal with the first frequency 80%. The PWM frequency of the input instruction is changed from the first frequency to a second frequency after the first time point T1 and before a second time point T2, wherein the second frequency is twice as the first frequency, and a second duty ratio of the PWM signal with the second frequency is 50%. Because the second frequency is within the frequency range, the controller 10 is switched from the rotation speed control mode to the light emission control mode. After the second time point T2, the PWM frequency of the input instruction is changed from the second frequency to a third frequency, the third frequency is twice as the second frequency, and a third duty ratio of the PWM signal with the third frequency is maintained as 50%. The input instruction of FIG. 3A is only one example of the present disclosure, so the PWM frequency of the input instruction or the duty ratio of the input instruction is not limited to FIG. 3A.

Figure 3B:
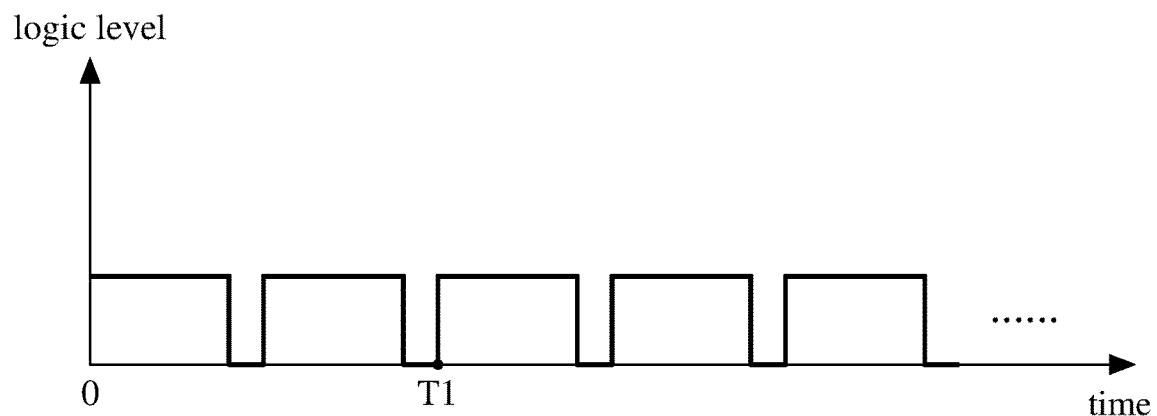
FIG. 3B is a timing diagram of a rotation speed control signal of the input instruction outputted to a fan motor and shown in FIG. 3A.

FIG. 3B is a timing diagram of a rotation speed control signal of the input instruction outputted to a fan motor and shown in FIG. 3A. As shown in FIG. 3B, a time interval for transmitting the input instruction from the input terminal 100 to the first output terminal 101 of the controller 10 is omitted. The PWM frequency of the PWM signal outputted from the first output terminal 101 of the controller 10 to the fan motor 12 is maintained in the first frequency, and a duty ratio of the PWM signal is maintained as 80%. In addition, the PWM signal shown in FIG. 3B is only one example of the present disclosure, and the PWM frequency of the PWM signal or the duty ratio of the PWM signal is not limited to FIG. 3B.

Figure 3C:
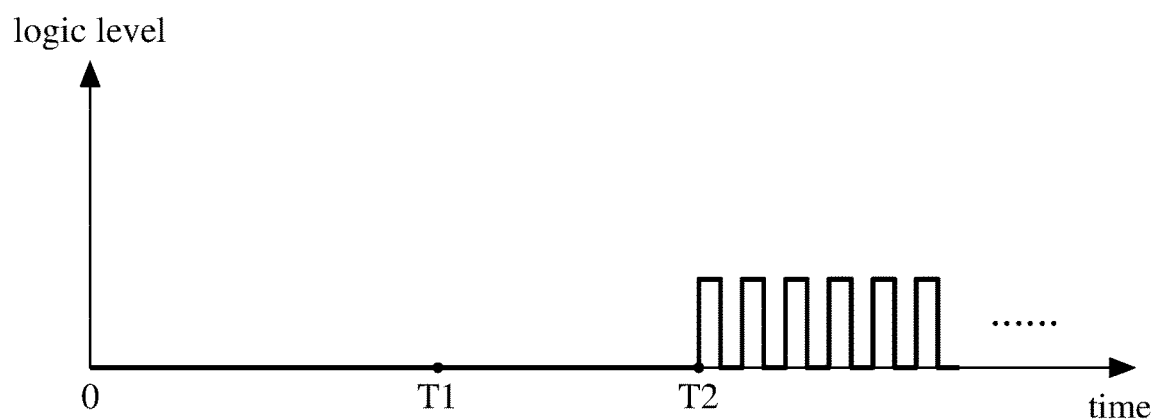
FIG. 3C is a timing diagram of a light emission control signal of the input instruction outputted to a driving circuit and shown in FIG. 3A.

FIG. 3C is a timing diagram of a light emission control signal of the input instruction outputted to a driving circuit and shown in FIG. 3A. As shown in FIG. 3C, the time interval for transmitting the input instruction from the input terminal 100 to the first output terminal 101 of the controller 10 is omitted. Before the time point T2, the second output terminal 102 of the controller 10 does not output any signal to the driving circuit 160. After the second time point T2, a PWM frequency of a PWM signal outputted from the second output terminal 102 of the controller 10 to the driving circuit 160 is maintained in the third frequency, and a duty ratio of the PWM signal outputted from the second output terminal 102 of the controller 10 to the driving circuit 160 is maintained in 50%. In addition, the PWM signal shown in FIG. 3C is only one example of the present disclosure, and the PWM frequency of the PWM signal or the duty ratio of the PWM signal is not limited to FIG. 3C.

In other embodiments, a first time section (0~T1) of the input instruction has the first frequency, a second time section (T1~T2) of the input instruction has the second frequency, and the input instruction has the third frequency at a third time point (not shown), the third time point is after the second time point T2. For example, a time difference between the third time point and the second time point T2 may be 10 ms. The time difference can apparently distinguish the second time point T2 from the third time point. Specifically, the input instruction whose frequency is in the second frequency is used for switching the mode of the controller 10, and the input instruction whose frequency is in the third frequency is used for controlling the light emitting element 16.

Figure 4:
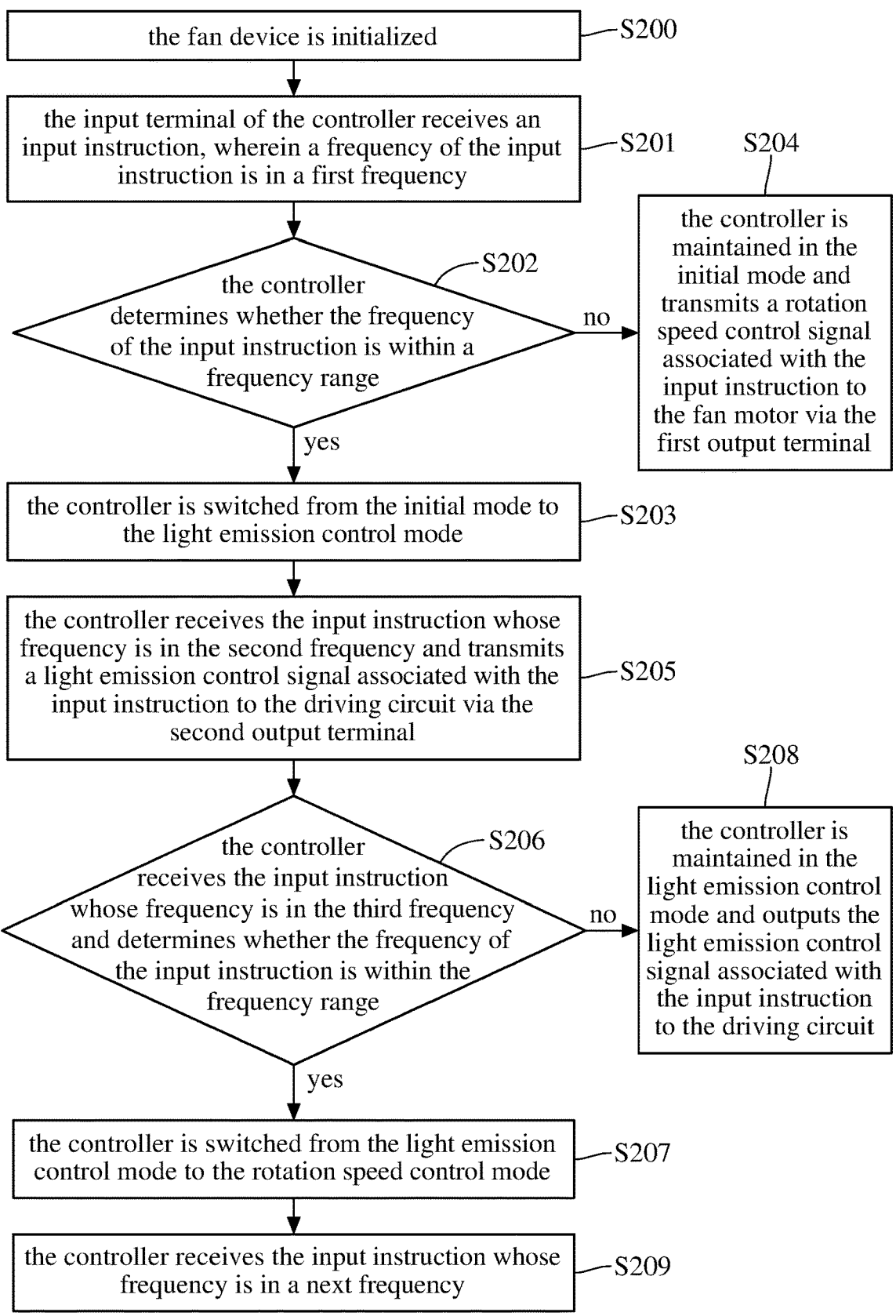
FIG. 4 is a flowchart of a control method of the fan device shown in FIG. 1 according to a second embodiment of the present disclosure.

FIG. 4 is a flowchart of a control method of the fan device shown in FIG. 1 according to a second embodiment of the present disclosure. In comparison with what is shown in FIG. 2, steps S204, S205 and S208 are illustrated in FIG. 4. Moreover, an input instruction of the second embodiment is not a PWM signal. In the step S204, the controller 10 is maintained in the initial mode and transmits a rotation speed control signal associated with the input instruction to the fan motor 12 via the first output terminal 101. Specifically, the rotation speed control signal is different from the input instruction, the rotation speed control signal is a PWM signal whose PWM frequency is in the first frequency, and a duty ratio of the rotation speed control signal is proportional to the rotation speed of the fan motor 12. In the step S205, the controller 10 receives the input instruction whose frequency is in the second frequency and transmits a light emission control signal associated with the input instruction to the driving circuit 160 via the second output terminal 102. Specifically, the light emission control signal is different from the input instruction, the light emission control signal is a PWM signal with the second frequency, and a duty ratio of the light emission control signal is proportional to the brightness of the light emitting diode 161. In the step S208, the controller is maintained in the light emission control mode and outputs the light emission control signal associated with the input instruction to the driving circuit 160.

Figure 5:
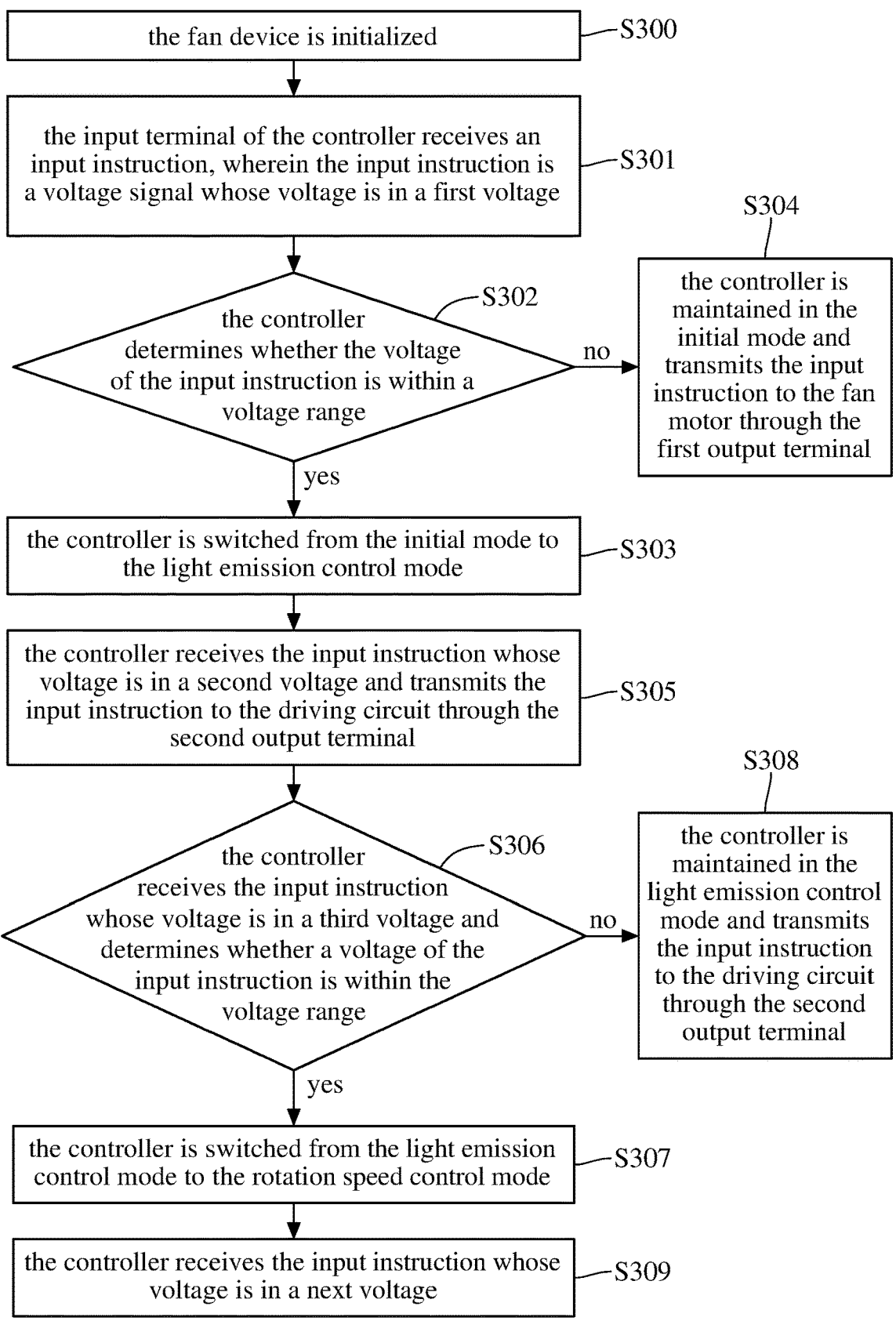
FIG. 5 is a flowchart of a control method of the fan device shown in FIG. 1 according to a third embodiment of the present disclosure.

FIG. 5 is a flowchart of a control method of the fan device shown in FIG. 1 according to a third embodiment of the present disclosure. As shown in FIG. 5, in a step S300, the fan device is initialized. After initializing the fan device, the initial mode of the controller 10 is in the rotation speed control mode, an initial rotation speed of the fan motor 12 is at zero, and a displaying state of each of the light emitting diodes 161 is in darkness. In a step S301, the input terminal 100 of the controller 10 receives an input instruction, wherein the input instruction is a voltage signal whose voltage is in a first voltage. In a step S302, the controller 10 determines whether a voltage of the input instruction is within a voltage range. When the controller 10 determines that the voltage of the input instruction is within the voltage range, then a step S303 is performed. When the controller 10 determines that the voltage of the input instruction is not within the voltage range, then a step S304 is performed.

In the step S303, the controller 10 is switched from the initial mode to the light emission control mode. In the step S304, the controller 10 is maintained in the initial mode and transmits the input instruction to the fan motor 12 through the first output terminal 101, so that the fan motor 12 may operate at a rotation speed, wherein the voltage of the input instruction is directly proportional to the rotation speed of the fan motor 12.

A step S305 is performed after the step S303. In the step S305, the controller 10 receives the input instruction whose voltage is in a second voltage and transmits the input instruction to the driving circuit 160 through the second output terminal 102, so that the driving circuit 160 controls the brightness of each of the light emitting diodes 161 and the color of each of the light emitting diodes 161, wherein the voltage of the input instruction is directly proportional to the brightness of each of the light emitting diodes 161.

In a step S306, the controller 10 receives the input instruction whose voltage is in a third voltage and determines whether the voltage of the input instruction is within the voltage range. When the controller 10 determines that the voltage of the input instruction is within the voltage range, then a step S307 is performed. When the controller 10 determines that the voltage of the input instruction is not within the voltage range, then a step S308 is performed.

In the step S307, the controller 10 is switched from the light emission control mode to the rotation speed control mode. In the step S308, the controller 10 is maintained in the light emission control mode and transmits the input instruction to the driving circuit 160 through the second output terminal 102.

A step S309 is performed after the step S307. In the step S309, the controller 10 receives the input instruction whose voltage is in a next voltage.

Figure 6A:
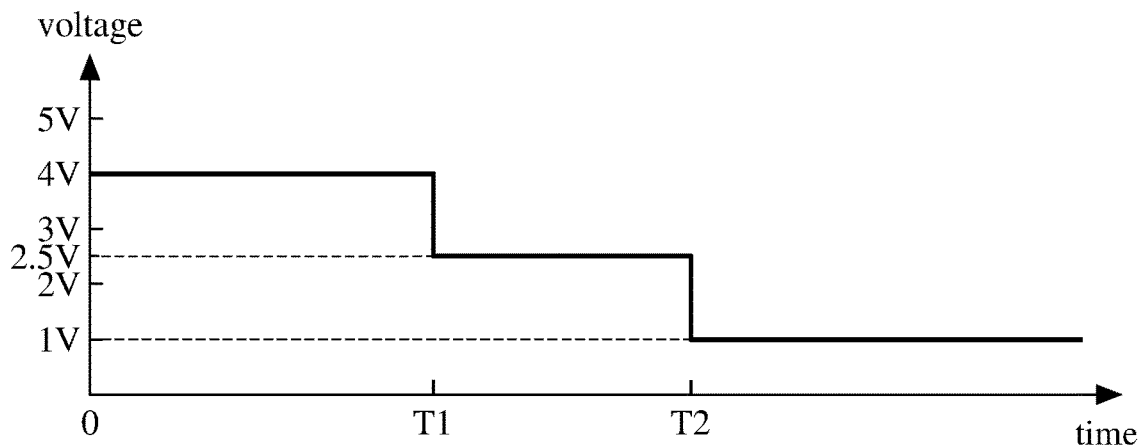
FIG. 6A is a timing diagram of an input instruction shown in FIG. 5 according to an embodiment of the present disclosure.

FIG. 6A is a timing diagram of an input instruction shown in FIG. 5 according to an embodiment of the present disclosure. As shown in FIG. 6A, the input instruction is a voltage signal. Before a first time point T1 of FIG. 6A, the controller 10 is in the rotation speed control mode, the input instruction is a voltage signal and the voltage signal serving as the input instruction has a first voltage (e.g. 4V). A voltage of the input instruction is changed from the first voltage to a second voltage (e.g. 2.5V) after the first time point T1 of FIG. 6A and before a second time point T2 of FIG. 6A. The controller 10 is switched from the rotation speed control mode to the light emission control mode because the second voltage is within a preset voltage range (e.g. 2V~3V). The voltage of the input instruction is changed from the second voltage to a third voltage (e.g. 1V) after the time point T2 of FIG. 6A.

Figure 6B:
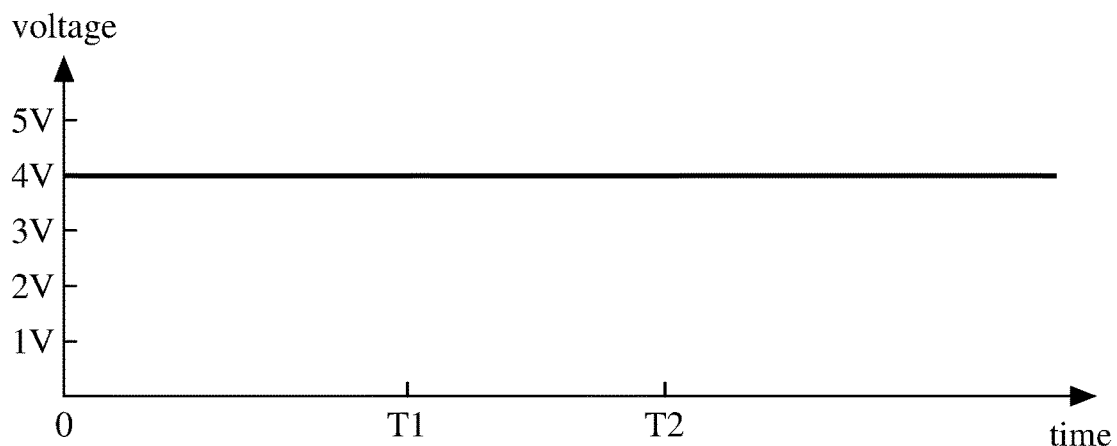
FIG. 6B is a timing diagram of a rotation speed control signal of the input instruction outputted to a fan motor and shown in FIG. 6A.

FIG. 6B is a timing diagram of a rotation speed control signal of the input instruction outputted to a fan motor and shown in FIG. 6A. As shown in FIG. 6B, the time section for transmitting the input instruction from the input terminal 100 to the first output terminal 101 of the controller 10 is omitted. The first output terminal 101 of the controller 10 starts to output a direct current (DC) voltage signal whose voltage is in the first voltage (e.g. 4V) to the fan motor 12 continuously.

Figure 6C:
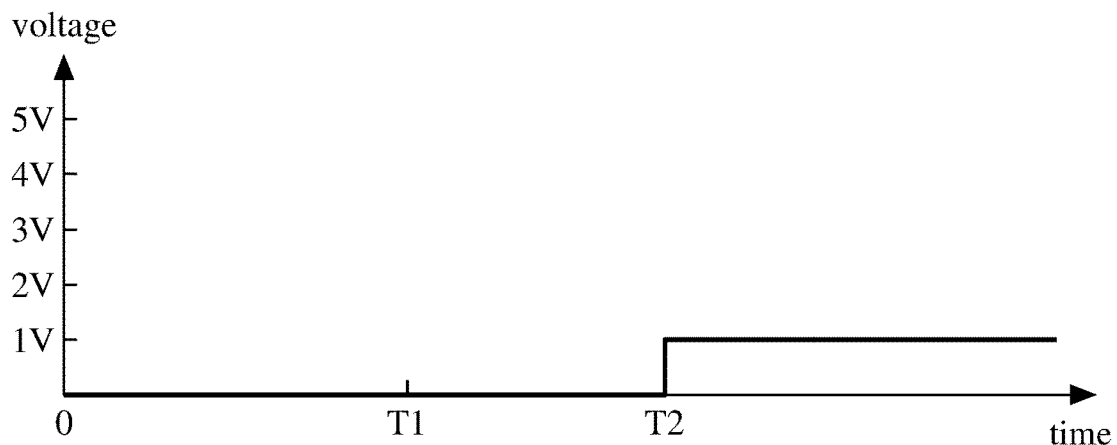
FIG. 6C is a timing diagram of a light emission control signal of the input instruction outputted to a driving circuit and shown in FIG. 6A.

FIG. 6C is a timing diagram of a light emission control signal of the input instruction outputted to a driving circuit and shown in FIG. 6A. In FIG. 6C, a time interval for transmitting the input instruction from the input terminal 100 to the second output terminal 102 of the controller 10 is omitted. The second output terminal 102 of the controller 10 does not output any signal to the driving circuit 160 before the time point T2. After the time point T2, the second output terminal 102 starts to output a direct current voltage signal whose voltage is in the third voltage (e.g. 1V) to the driving circuit 160 continuously.

In other embodiments, a first time section (0~T1) of the input instruction has the first voltage, a second time section (T1~T2) of the input instruction has the second voltage, and the input instruction has the third voltage at a third time point. The third time point is after the second time point T2. For example, a time difference between the third time point and the second time point T2 may be 10 ms. The time difference can apparently distinguish the second time point T2 from the third time point. Specifically, the input instruction whose voltage is in the second voltage is used for switching the mode of the controller 10, and the input instruction whose voltage is in the third voltage is used for controlling the light emitting element 16.

Figure 7:
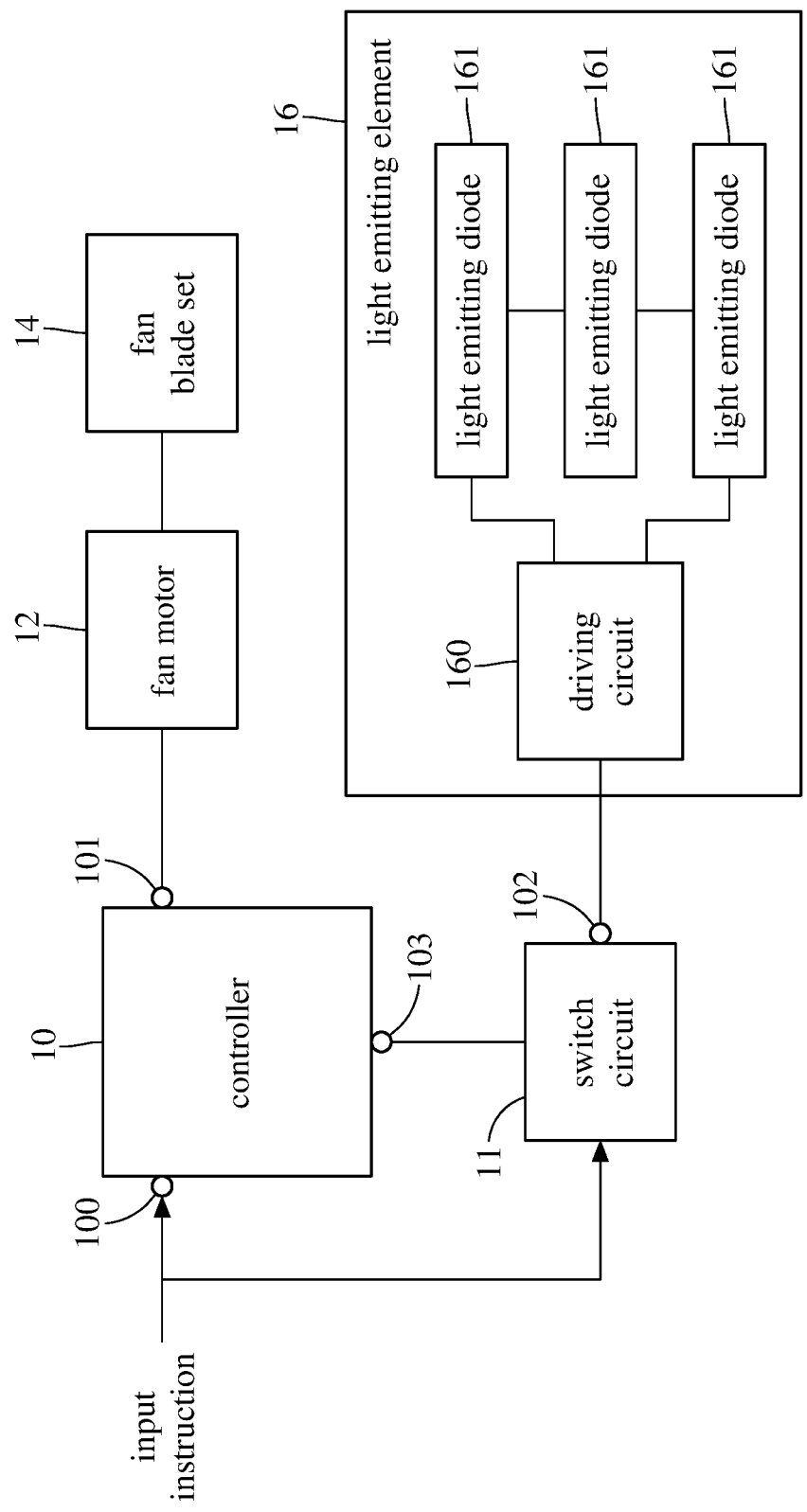
FIG. 7 is a block diagram of a fan device according to a second embodiment of the present disclosure.

FIG. 7 is a block diagram of a fan device according to a second embodiment of the present disclosure. In comparison with what is shown in FIG. 1, a switch circuit 11 of the processor is illustrated in FIG. 7. For example, the switch circuit 11 may be a transistor or a relay. The input terminal 100 and the first output terminal 101 are disposed at the controller 10, and the controller 10 further comprises a control terminal 103. The switch circuit 11 may be a three-terminal element. The control terminal 103 and the input terminal 100 are respectively connected to a first terminal and a second terminal of the switch circuit 11, and the second output terminal 102 serves as a third terminal of the switch circuit 11.

Regarding with an operation mechanism of the second embodiment of the fan device, when the controller 10 is in the rotation speed control mode, the input terminal 100 is electrically connected to the first output terminal 101 and the control terminal 103 outputs a low level signal (such as a low voltage signal) to the switch circuit 11, and the low level signal causes the switch circuit 11 to be in an off-state. When the switch circuit 11 is in the off-state, an electrical connection which is between the input terminal 100 and the second output terminal 102 is broken. When the controller 10 is in the light emission control mode, the control terminal 103 outputs a high level signal (such as a high voltage signal) to the switch circuit 11, and the high level signal causes the switch circuit 11 to be in an on-state. When the switch circuit 11 is in the on-state, the electrical connection which is between the input terminal 100 and the second output terminal 102 is activated. In the other embodiment, the control terminal 103 may output a high level signal (such as a high voltage signal) to the switch circuit 11, and the high level signal causes the switch circuit 11 to be in the off-state, and the control terminal 103 may output a low level signal (such as a low voltage signal) to the switch circuit 11, and the low level signal causes the switch circuit 11 to be in the on-state.

Figure 8:
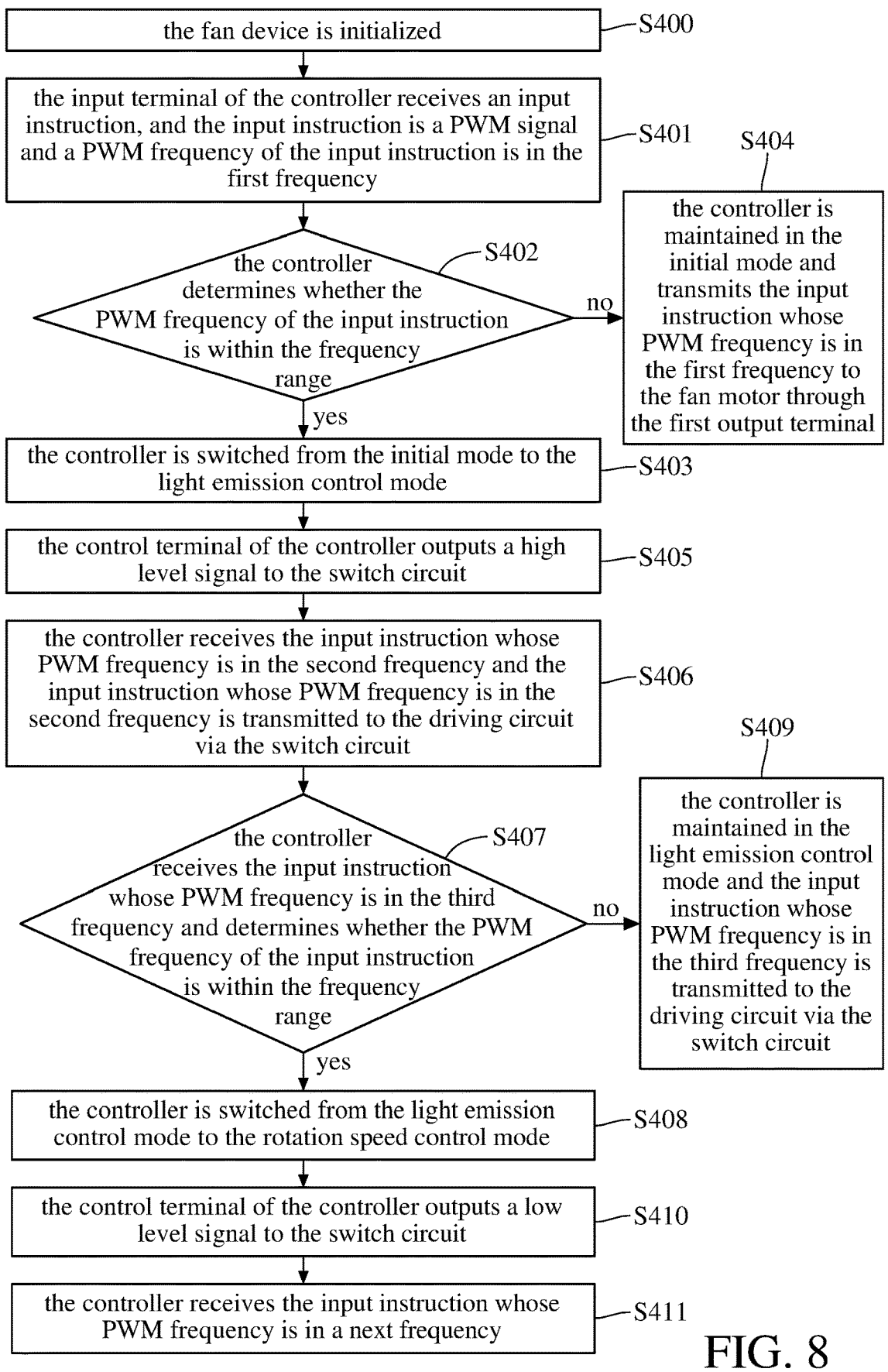
FIG. 8 is a flowchart of a control method of the fan device shown in FIG. 7 according to a first embodiment of the present disclosure.

FIG. 8 is a flowchart of a control method of the fan device shown in FIG. 7 according to a first embodiment of the present disclosure. In a step S400, the fan device is initialized. After initializing the fan device, the initial mode of the controller 10 is in the rotation speed control mode, the initial speed of the fan motor 12 is at zero, the displaying state of each of the light emitting diodes 161 is in darkness, and the switch circuit 11 is in the off-state. In a step S401, the input terminal 100 of the controller 10 receives an input instruction, and the input instruction is a PWM signal and a PWM frequency of the PWM signal is in the first frequency. In a step S402, the controller 10 determines whether the PWM frequency of the input instruction is within the frequency range. When the controller 10 determines that the PWM frequency of the input instruction is within the frequency range, then a step S403 is performed. When the controller 10 determines that the PWM frequency of the input instruction is not within the frequency range, then a step S404 is performed.

In the step S403, the controller 10 is switched from the initial mode to the light emission control mode. In the step S404, the controller 10 is maintained in the initial mode and transmits the input instruction whose PWM frequency is in the first frequency to the fan motor 12 through the first output terminal 101.

A step S405 is performed after the step S403. In the step S405, the control terminal 103 of the controller 10 outputs a high level signal to the switch circuit 11, and the high level signal causes the switch circuit 11 to be switched from the off-state to the on-state. In other embodiment, the control terminal 103 may output a low level signal to cause the switch circuit 11 to be switched from the off-state to the on-state.

In a step S406, the controller 10 receives the input instruction whose PWM frequency is in the second frequency and the input instruction whose PWM frequency is in the second frequency is transmitted to the driving circuit 160 via the switch circuit 11, so that the driving circuit 160 controls the brightness of each of the light emitting diodes 161 and the color of each of the light emitting diodes 161 according to the input instruction whose PWM frequency is in the second frequency.

In a step S407, the controller 10 receives the input instruction whose PWM frequency is in the third frequency and determines whether the PWM frequency of the input instruction is within the frequency range. When the controller 10 determines that the PWM frequency of the input instruction is within the frequency range, then a step S408 is performed. When the controller 10 determines that the PWM frequency of the input instruction is not within the frequency range, then a step S409 is performed.

In the step S408, the controller 10 is switched from the light emission control mode to the rotation speed control mode. In the step S409, the controller 10 is maintained in the light emission control mode and the input instruction whose PWM frequency is in the third frequency is transmitted to the driving circuit 160 via the switch circuit 11.

A step S410 is performed after the step S408. In the step S410, the control terminal 103 of the controller 10 outputs a low level signal to the switch circuit 11, and the low level signal causes the switch circuit 11 to be switched from the on-state to the off-state. In a step S411, the controller 10 receives the input instruction whose PWM frequency is in a next frequency. In other embodiment, the control terminal 103 may output a high level signal to cause the switch circuit 11 to be switched from the on-state to the off-state.

Figure 9A:
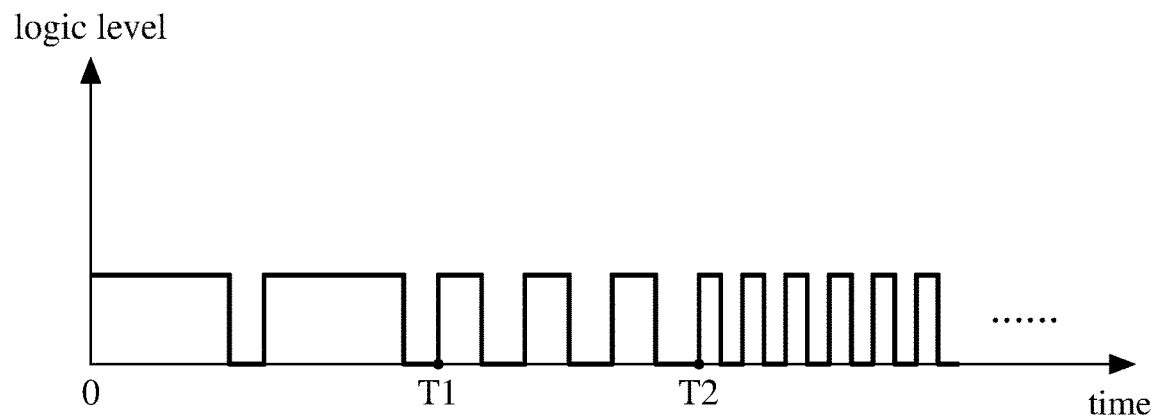
FIG. 9A is a timing diagram of an input instruction shown in FIG. 8 according to an embodiment of the present disclosure.

FIG. 9A is a timing diagram of an input instruction shown in FIG. 8 according to an embodiment of the present disclosure. As shown in FIG. 9A, the input instruction is a PWM signal. Before a first time point T1 of FIG. 9A, the controller 10 is in the rotation speed control mode, the PWM frequency of the PWM signal serving as the input instruction has the first frequency, and the first duty ratio of the PWM signal with the first frequency is in 80%. The PWM frequency of the input instruction is changed from the first frequency to the second frequency after the first time point T1 and before a second time point T2 of FIG. 9A, wherein the second frequency is twice as the first frequency, the second duty ratio of the PWM signal with the second frequency is in 50%. Because the second frequency is within the frequency range, the controller 10 is switched from the rotation speed control mode to the light emission control mode. After the second time point T2, the PWM frequency of the input instruction is changed from the second frequency to the third frequency, the third frequency is twice as the second frequency, and the third duty ratio of the PWM signal with the third frequency is maintained in 50%. The input instruction of FIG. 9A is only one example of the present disclosure, so the frequency of the input instruction or the duty ratio of the input instruction is not limited to FIG. 9A.

Figure 9B:
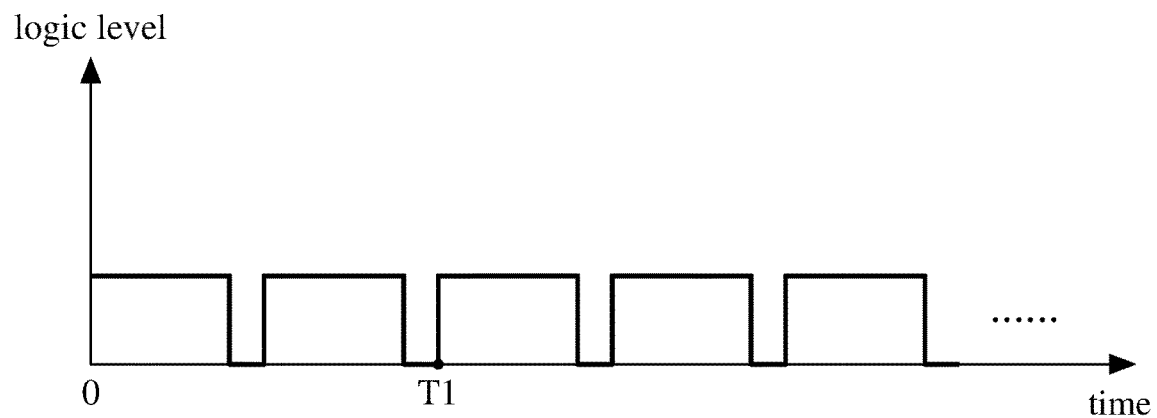
FIG. 9B is a timing diagram of a rotation speed control signal of the input instruction outputted to a fan motor and shown in FIG. 9A.

FIG. 9B is a timing diagram of a rotation speed control signal of the input instruction outputted to a fan motor and shown in FIG. 9A. As shown in FIG. 9B, a time interval for transmitting the input instruction from the input terminal 100 of the controller 10 to the first output terminal 101 of the controller 10 is omitted. The PWM frequency of the PWM signal outputted from the first output terminal 101 to the fan motor 12 is maintained in the first frequency, and a duty ratio of the PWM signal is maintained in 80%.

Figure 9C:
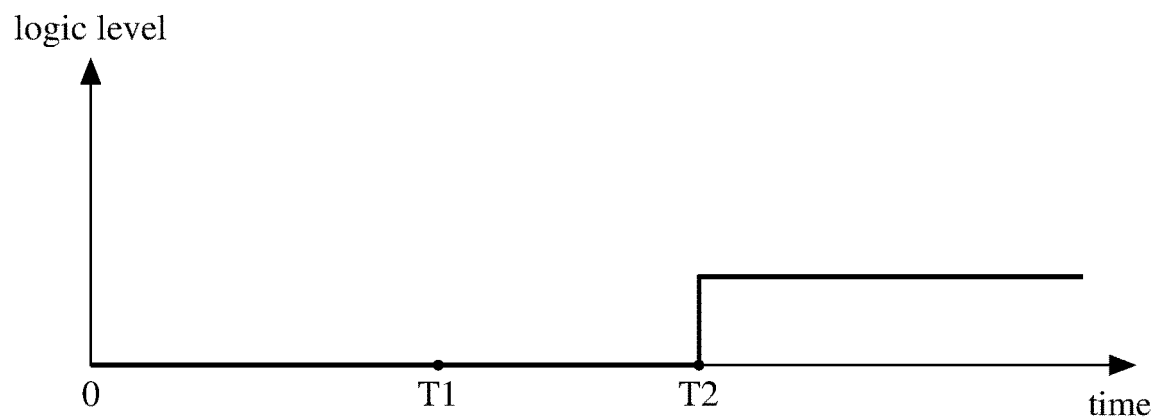
FIG. 9C is a timing diagram of a light emission control signal of the input instruction outputted to a switch circuit and shown in FIG. 9A.

FIG. 9C is a timing diagram of a light emission control signal of the input instruction outputted to a switch circuit and shown in FIG. 9A. As shown in FIG. 9C, a time interval for transmitting the input instruction from the input terminal 100 to the control terminal 103 is omitted. Before the time point T2, a level of a control signal outputted from the control terminal 103 to the switch circuit 11 is maintained in a low level. After the time point T2, the level of the control signal outputted from the control terminal 103 to the switch circuit 11 is changed from the low level to a high level. In other embodiment, the level of the control signal outputted from the control terminal 103 to the switch circuit 11 may be maintained in a high level before the time point T2. After the time point T2, the level of the control signal outputted from the control terminal 103 to the switch circuit 11 is changed from the high level to a low level.

Figure 10:
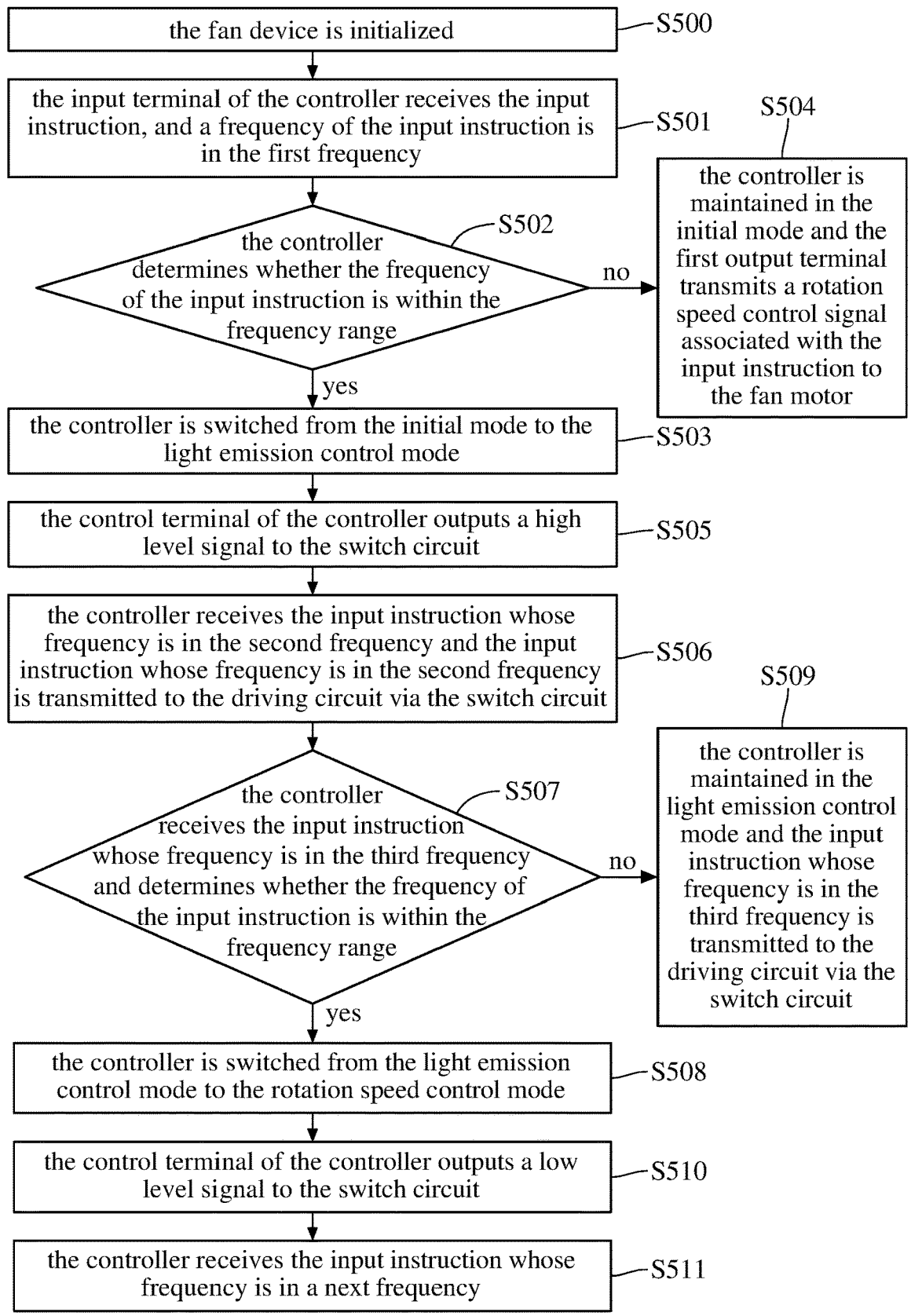
FIG. 10 is a flowchart of a control method of the fan device shown in FIG. 7 according to a second embodiment of the present disclosure.

FIG. 10 is a flowchart of a control method of the fan device shown in FIG. 7 according to a second embodiment of the present disclosure. In comparison with what is shown in FIG. 8, a step S504 and an input instruction which is not a PWM signal are illustrated in FIG. 10. In the step S504, the controller 10 is maintained in the initial mode and the first output terminal 101 transmits a rotation speed control signal associated with the input instruction to the fan motor 12.

Figure 11:
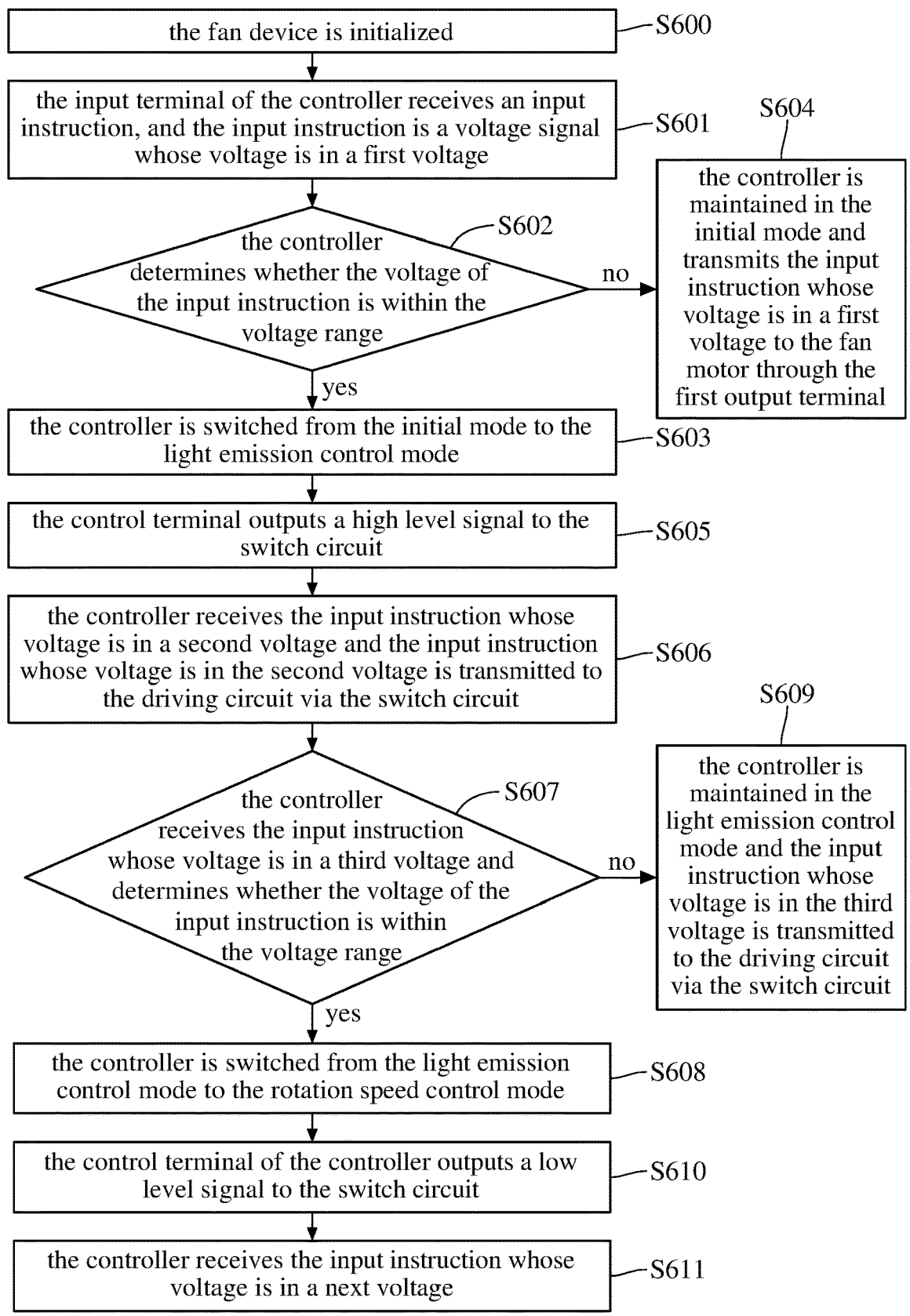
FIG. 11 is a flowchart of a control method of the fan device shown in FIG. 7 according to a third embodiment of the present disclosure.

FIG. 11 is a flowchart of a control method of the fan device shown in FIG. 7 according to a third embodiment of the present disclosure. As shown in FIG. 11, In a step S600, the fan device is initialized. After initializing the fan device, the initial mode of the controller 10 is in the rotation speed control mode, the initial speed of the fan motor 12 is at zero, the displaying state of each of the light emitting diodes 161 is in darkness, and the switch circuit 11 is in an off-state. In a step S601, the input terminal 100 of the controller 10 receives an input instruction, and the input instruction is a voltage signal whose voltage is in a first voltage. In a step S602, the controller 10 determines whether a voltage of the input instruction is within a voltage range. When the controller 10 determines that the voltage of the input instruction is within the voltage range, then a step S603 is performed. When the controller 10 determines that the voltage of the input instruction is not within the voltage range, then a step S604 is performed.

In the step S603, the controller 10 is switched from the initial mode to the light emission control mode. In the step S604, the controller 10 is maintained in the initial mode and transmits an input instruction whose voltage is in a first voltage to the fan motor 12 through the first output terminal 101.

A step S605 is performed after the step S603. In the step S605, the control terminal 10 outputs a high level signal to the switch circuit 11, and the high level signal causes the switch circuit 11 to be switched from the off-state to the on-state. In a step S606, the controller 10 receives the input instruction whose voltage is in a second voltage and the input instruction whose voltage is in the second voltage is transmitted to the driving circuit 160 via the switch circuit 11. In a step S607, the controller 10 receives the input instruction whose voltage is in a third voltage and determines whether a voltage of the input instruction is within the voltage range. When the controller 10 determines that the voltage of the input instruction is within the voltage range, then a step S608 is performed. When the controller 10 determines that the voltage of the input instruction is not within the voltage range, then a step S609 is performed.

In the step S608, the controller 10 is switched from the light emission control mode to the rotation speed control mode. In the step S609, the controller 10 is maintained in the light emission control mode and the input instruction whose voltage is in the third voltage is transmitted to the driving circuit 160 via the switch circuit 11.

A step S610 is performed after the step S608. In the step S610, the control terminal 103 of the controller 10 outputs a low level signal to the switch circuit 11, and the low level signal causes the switch circuit 11 to be switched from an on-state to an off-state. In a step S611, the controller 10 receives the input instruction whose voltage is in a next voltage. In the other embodiment, the control terminal 103 may output a high level signal to cause the switch circuit 11 to be switched from the on-state to the off-state.

Figure 12:
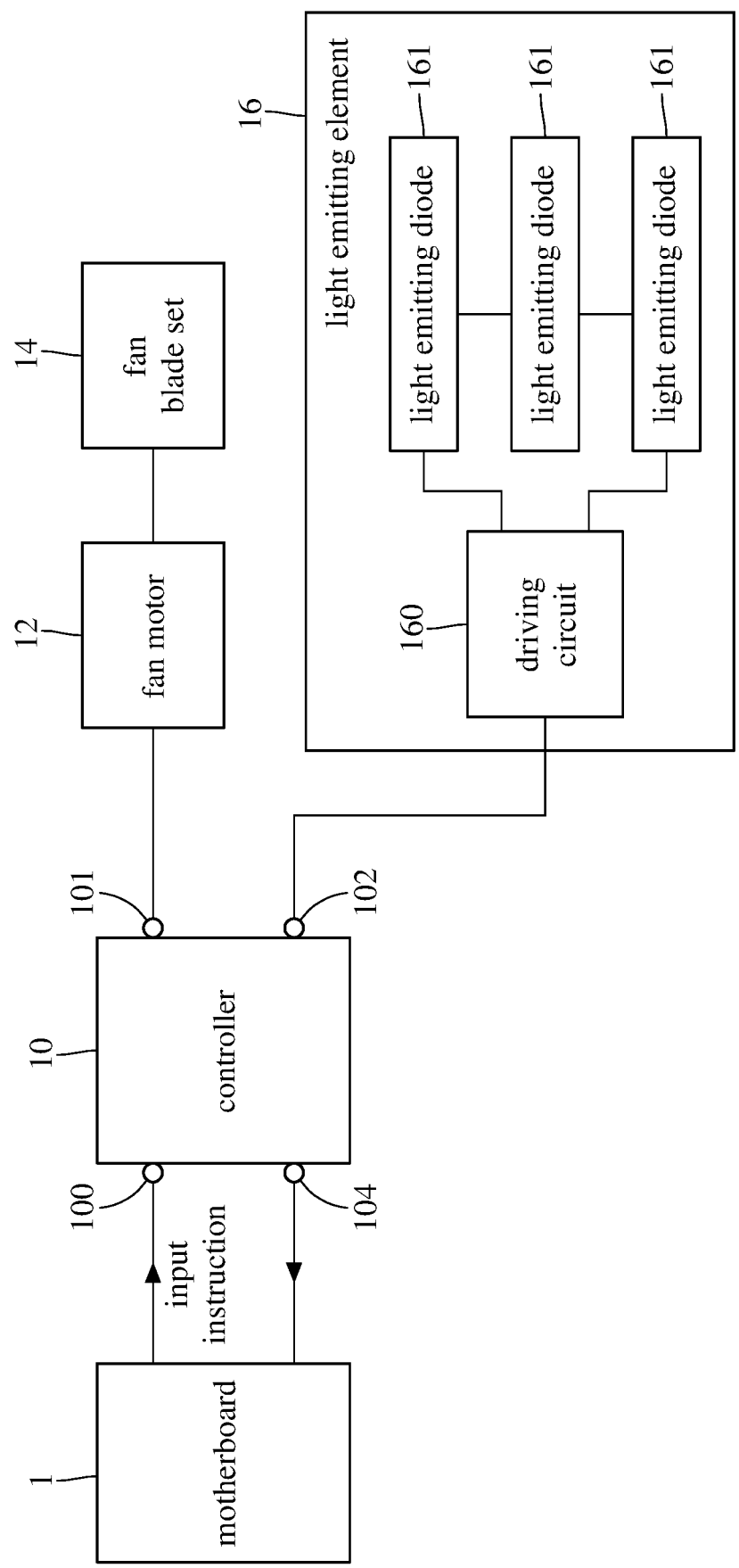
FIG. 12 is a block diagram of a fan system according to a first embodiment of the present disclosure.

FIG. 12 is a block diagram of a fan system according to a first embodiment of the present disclosure. As shown in FIG. 12, the fan system of FIG. 12 further comprises a motherboard 1 in addition to the fan device of FIG. 1. The motherboard 1 outputs an input instruction to the input terminal 100 of the controller 10. The controller 10 is further provided with a third output terminal 104, and the third output terminal 104 is electrically connected to the motherboard 1, the fan motor 12, and the light emitting element 16. The third output terminal 104 is at least configured to transmit a current rotation speed of the fan motor 12, a service life of the fan motor 12, and a service life of the controller 10 to the motherboard 1. Except the current rotation speed and the service life, the third output terminal 104 may be configured to transmit other information related to the fan device. Moreover, in other embodiment, the fan system further comprises a control box (not shown), and the control box is connected between the motherboard 1 and the controller 10, so the motherboard 1 outputs the input instruction to the controller 10 via the control box.

Furthermore, regarding with an operation mechanism of the first embodiment of the fan system of the present disclosure, when the controller 10 which is in the rotation speed control mode causes the fan motor 12 to operate at a rotation speed, then the controller 10 is switched from the rotation speed control mode to the light emission control mode. When the controller 10 is in the light emission control mode, the controller 10 continuously transmits a last rotation speed control signal to the fan motor 12, so that a rotation speed of the fan motor 12 is maintained in a last rotation speed. Similarly, when the controller 10 which is in the light emission control mode causes each of the light emitting diodes 161 to display a brightness and a color, then the controller 10 is switched from the light emission control mode to the rotation speed control mode and the driving circuit 160 continuously outputs a last light emission control signal to each of the light emitting diodes 161 for controlling a brightness of each of the light emitting diodes 161 and a color of each of the light emitting diodes 161 to be maintained in a last brightness and a last color.

Figure 13:
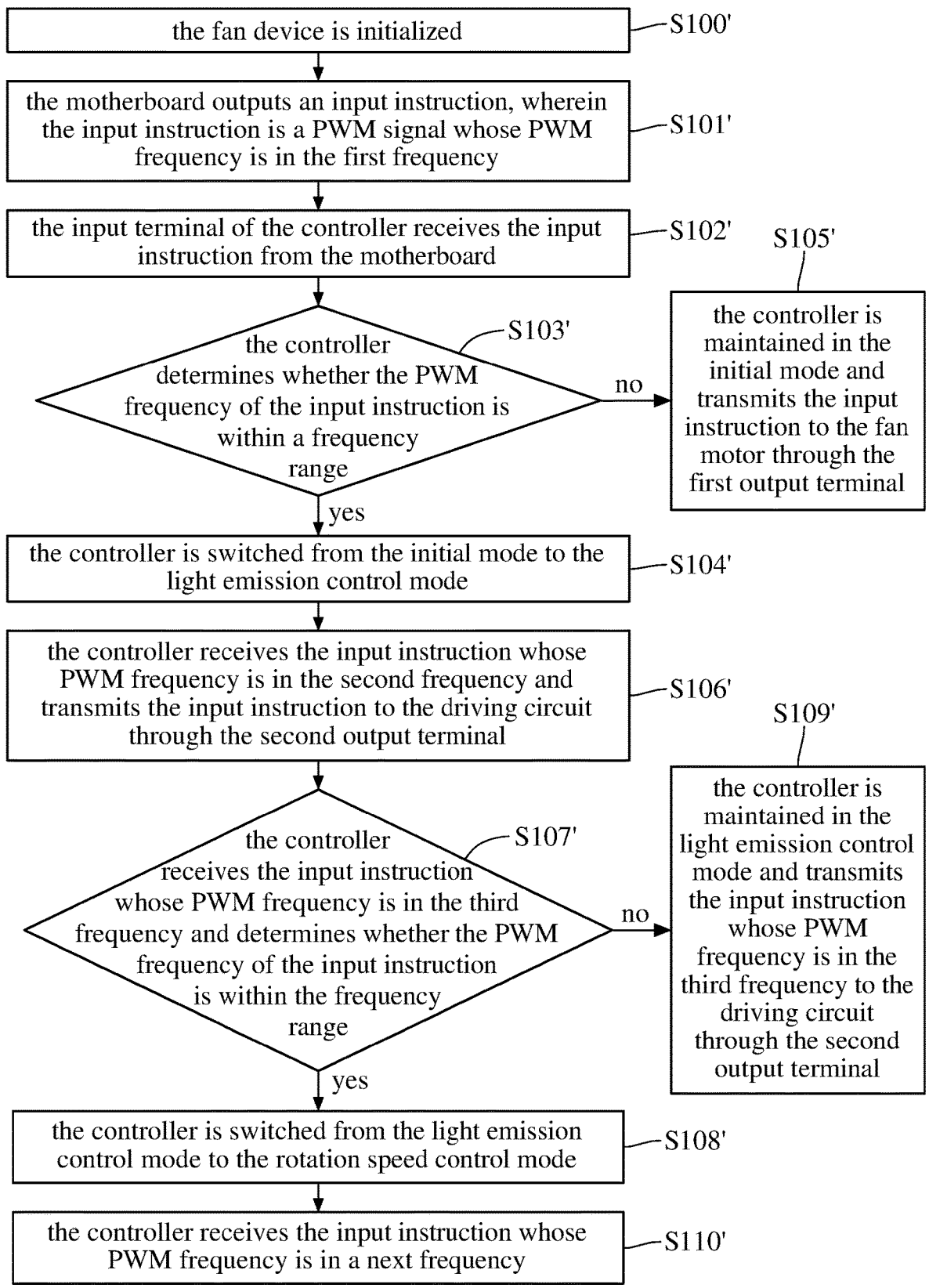
FIG. 13 is a flowchart of a control method of the fan system shown in FIG. 12 according to a first embodiment of the present disclosure.

FIG. 13 is a flowchart of a control method of the fan system shown in FIG. 12 according to a first embodiment of the present disclosure. In comparison with what is shown in FIG. 2, steps S101'-S102' are illustrated in FIG. 13. In the step S101', the motherboard 1 outputs an input instruction, wherein the input instruction is a PWM signal whose PWM frequency is in the first frequency. In the step S102', the input terminal 100 of the controller 10 receives the input instruction from the motherboard 1.

Figure 14:
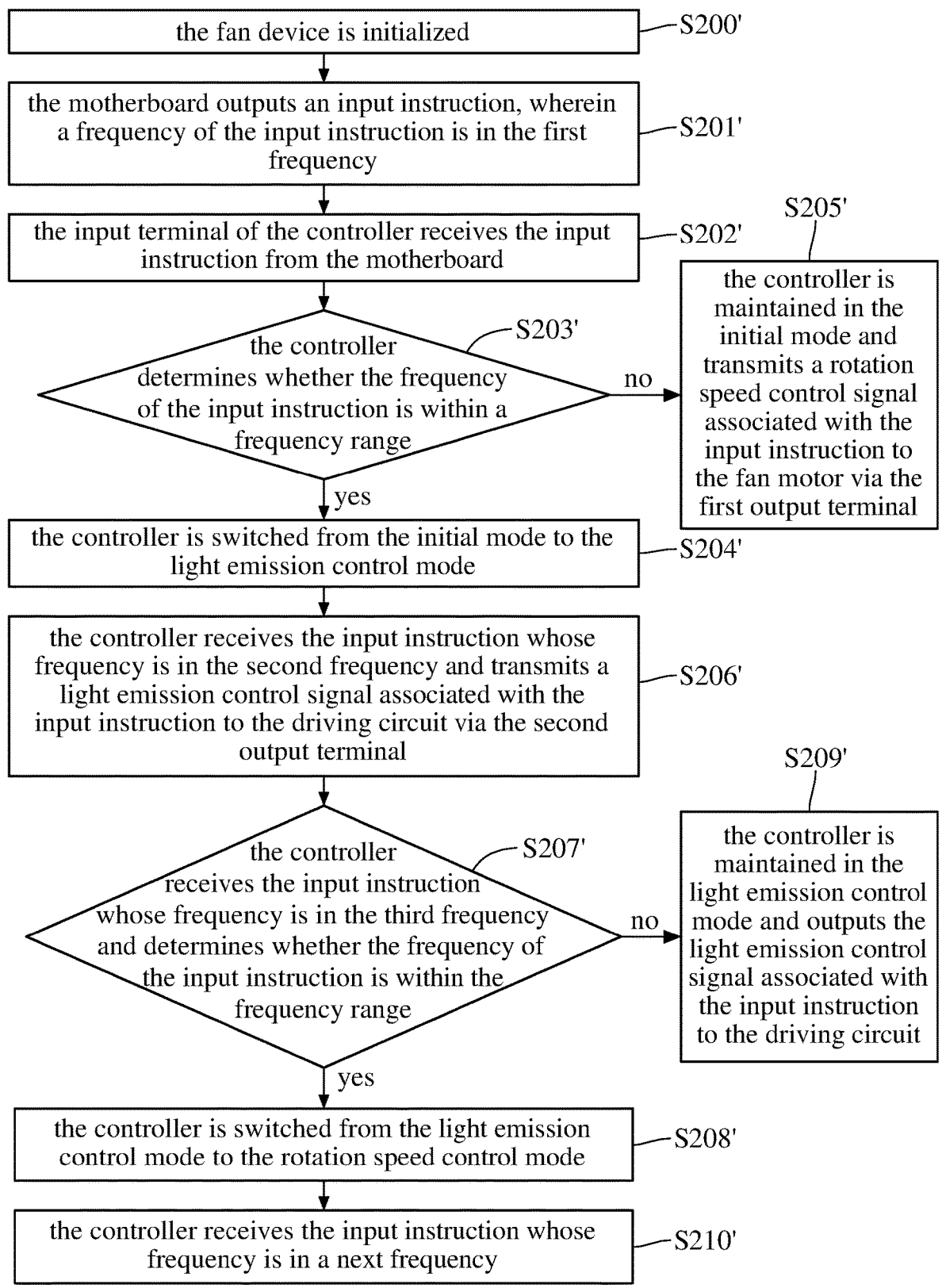
FIG. 14 is a flowchart of a control method of the fan system shown in FIG. 12 according to a second embodiment of the present disclosure.

FIG. 14 is a flowchart of a control method of the fan system shown in FIG. 12 according to a second embodiment of the present disclosure. In comparison with what is shown in FIG. 4, steps S201'-S202' are illustrated in FIG. 14. In the step S201', the motherboard 1 outputs an input instruction, wherein a frequency of the input instruction is in the first frequency. In the step S202', the input terminal 100 of the controller 10 receives the input instruction from the motherboard 1.

Figure 15:
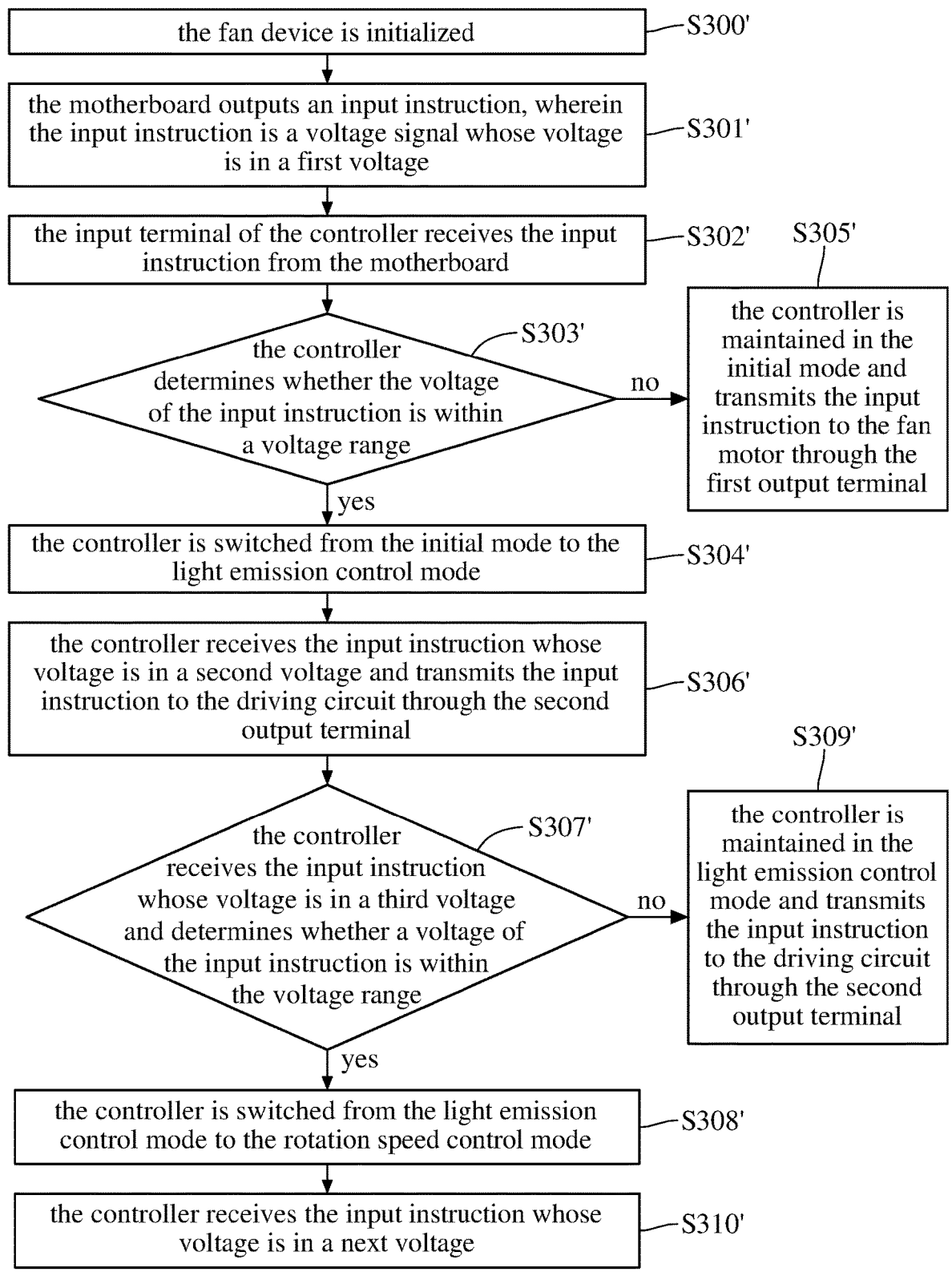
FIG. 15 is a flowchart of a control method of the fan system shown in FIG. 12 according to a third embodiment of the present disclosure.

FIG. 15 is a flowchart of a control method of the fan system shown in FIG. 12 according to a third embodiment of the present disclosure. In comparison with what is shown in FIG. 5, steps S301'-S302' are illustrated in FIG. 15. In the step S301', the motherboard 1 outputs an input instruction, wherein the input instruction is a voltage signal whose voltage is in a first voltage. In the step S302', the input terminal 100 of the controller 10 receives the input instruction from the motherboard 1.

Figure 16:
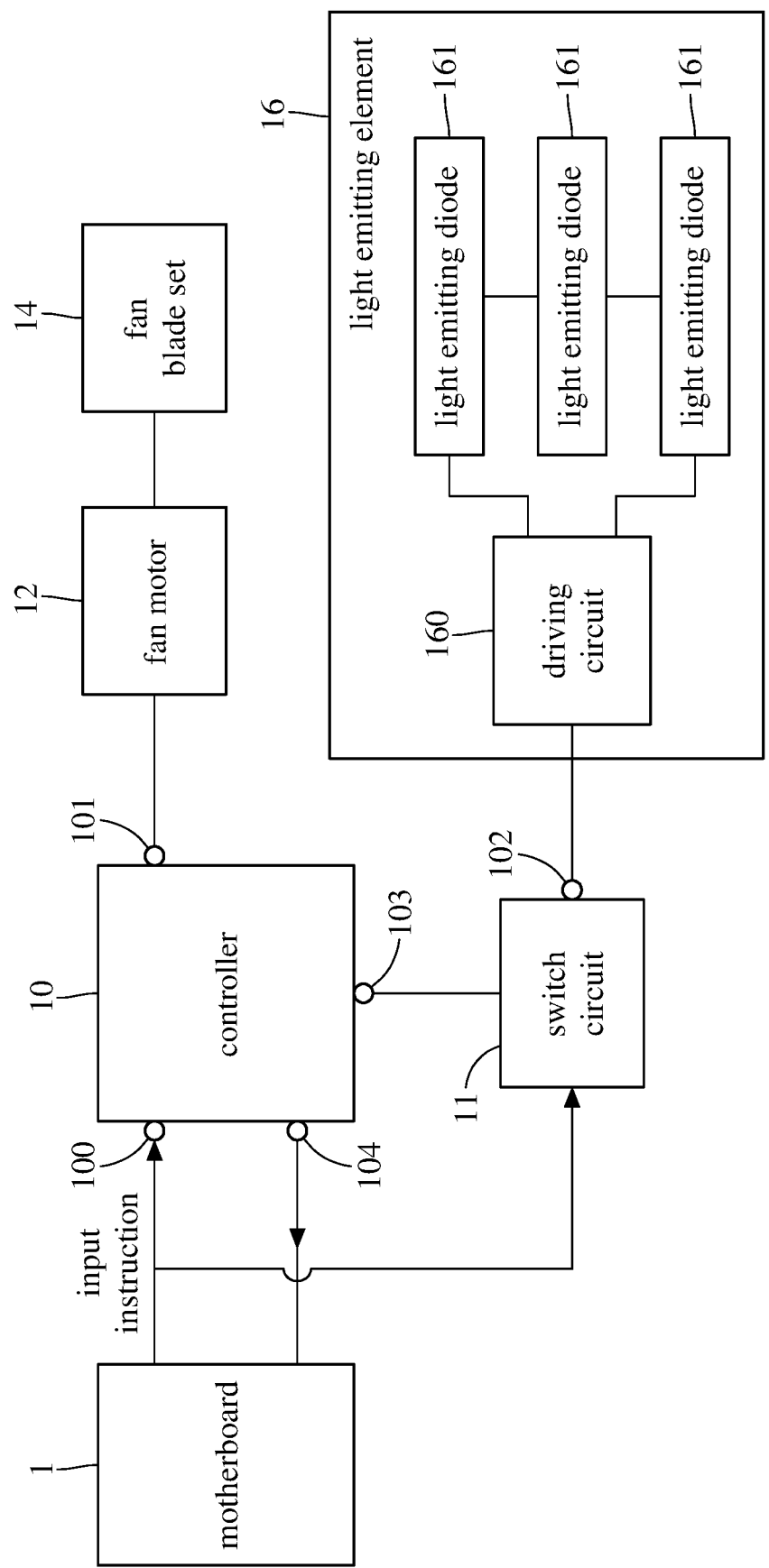
FIG. 16 is a block diagram of a fan system according to a second embodiment of the present disclosure.

FIG. 16 is a block diagram of a fan system according to a second embodiment of the present disclosure. As shown in FIG. 16, the fan system of FIG. 16 further comprises the motherboard 1 in addition to the fan device of FIG. 7. The motherboard 1 outputs an input instruction to the input terminal 100 of the controller 10 and the first terminal of the switch circuit 11.

Figure 17:
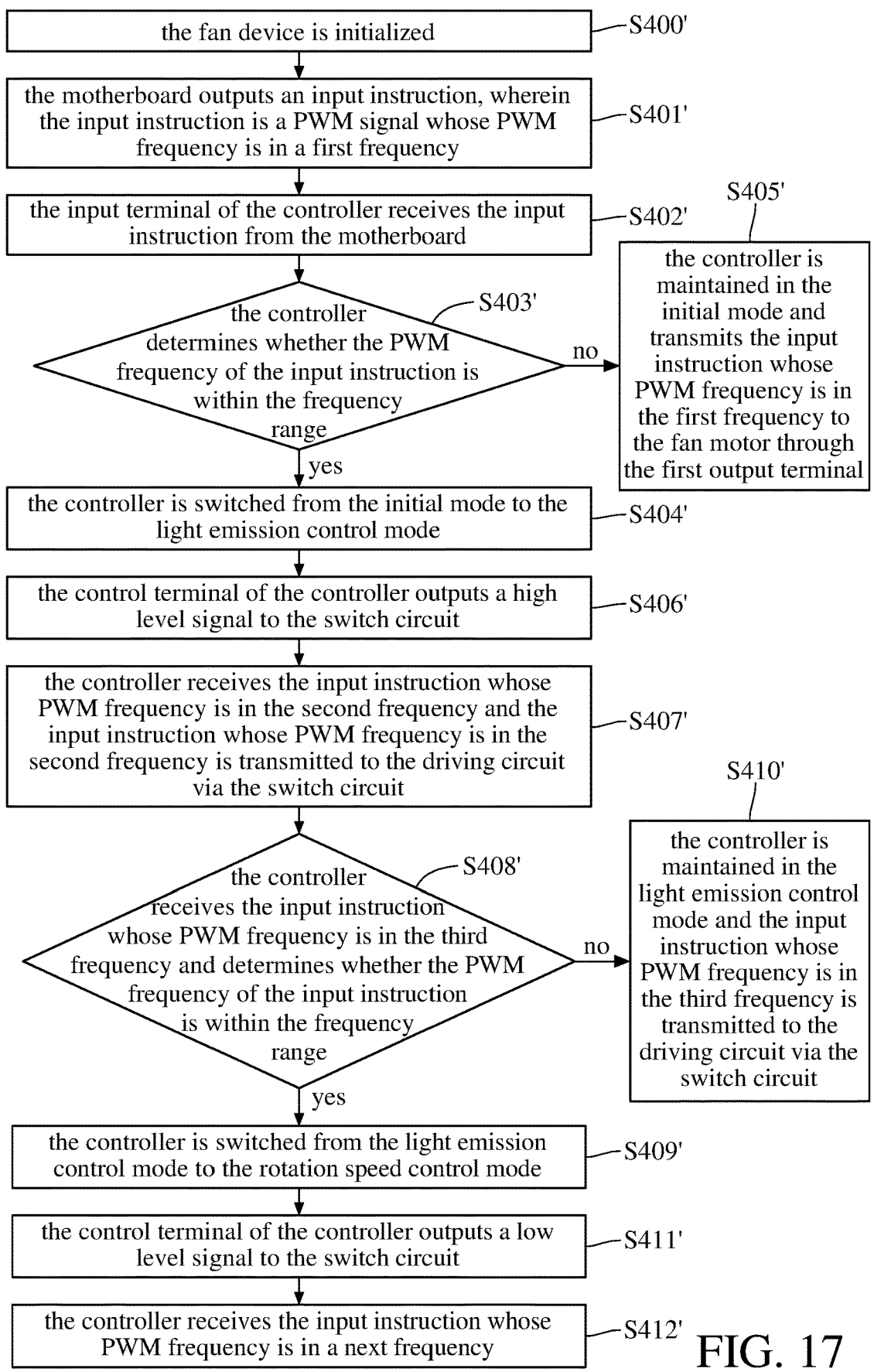
FIG. 17 is a flowchart of a control method of the fan system shown in FIG. 16 according to a first embodiment of the present disclosure.

FIG. 17 is a flowchart of a control method of the fan system shown in FIG. 16 according to a first embodiment of the present disclosure. In comparison with what is shown in FIG. 8, steps S401'-S402' are illustrated in FIG. 17. In the step S401', the motherboard 1 outputs an input instruction, wherein the input instruction is a PWM signal whose PWM frequency is in a first frequency. In the step S402', the input terminal 100 of the controller 10 receives the input instruction from the motherboard 1.

Figure 18:
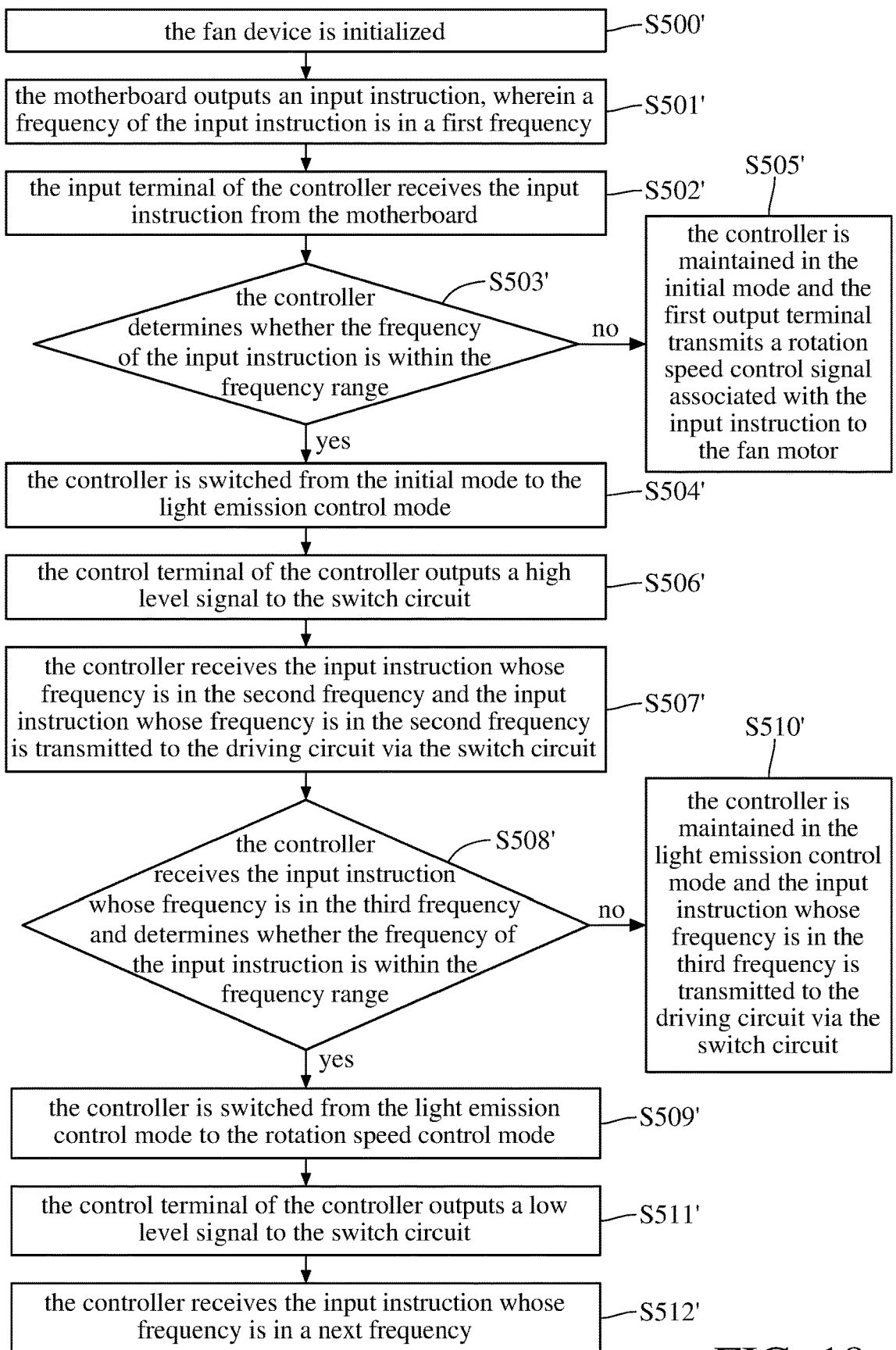
FIG. 18 is a flowchart of a control method of the fan system shown in FIG. 16 according to a second embodiment of the present disclosure.

FIG. 18 is a flowchart of a control method of the fan system shown in FIG. 16 according to a second embodiment of the present disclosure. In comparison with what is shown in FIG. 10, steps S501'-S502' are illustrated in FIG. 18. In the step S501', the motherboard 1 outputs an input instruction, wherein a frequency of the input instruction is in a first frequency. In the step S502', the input terminal 100 of the controller 10 receives the input instruction from the motherboard 1.

Figure 19:
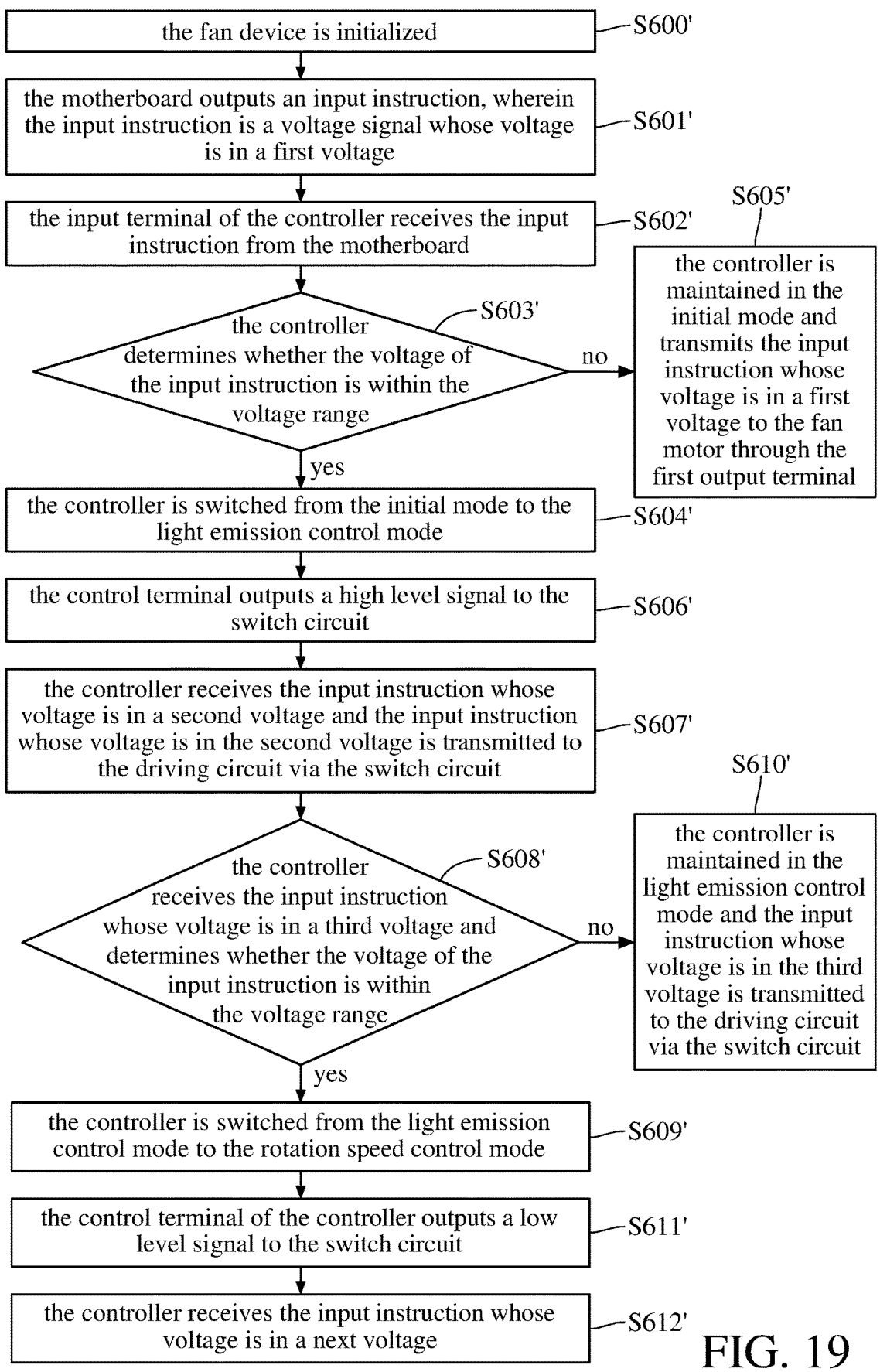
FIG. 19 is a flowchart of a control method of the fan system shown in FIG. 16 according to a third embodiment of the present disclosure.

FIG. 19 is a flowchart of a control method of the fan system shown in FIG. 16 according to a third embodiment of the present disclosure. In comparison with what is shown in FIG. 11, steps S601'-S602' are illustrated in FIG. 19. In the step S601', the motherboard 1 outputs an input instruction, wherein the input instruction is a voltage signal whose voltage is in a first voltage. In the step S602', the input terminal 100 of the controller 10 receives the input instruction from the motherboard 1.

In other embodiments, in addition to determining whether the frequency of the input instruction is within the frequency range, the control method of the fan device or the fan system may further a step of determining whether a duty ratio of an input instruction complies with a preset duty ratio and/or determining whether the number of on-duration of the input instruction complies with a preset number. For example, the input instruction can switch the mode of the controller 10 only when a frequency of the input instruction is within 25 KHz~40 KHz, a duty ratio of the input instruction is in 40%, and the number of an on-duration of the input instruction is in ten, In other embodiments, the controller 10 further comprises the third output terminal 104, and the third output terminal 104 at least transmits information comprising the current speed of the fan motor 12, the service life of the fan motor 12, and the service life of the controller 10 to the motherboard 1. Statuses of the fan motor 12 and the controller 10 can be monitored in real time according to the above information.

In view of the above description, any user can control the rotation speed of the fan motor and the displaying state of the light emitting element at any time according to the demand of the user. Because the displaying state of the light emitting element is not limited to the rotation speed of the fan motor and is directly controlled by the input instruction which is transmitted form the motherboard, the light emitting element can provide various combinations of brightness and color. Furthermore, the input terminal of the processor is directly used to receive the input instruction from the motherboard for proceeding subsequent controls of the fan motor and light emitting element without changing an overall hardware architecture of the fan device or the fan system, which can avoid the complexity of the overall hardware architecture as well as the increase in manufacture cost.

What is claimed is:

1. A fan device, comprising:
a processor comprising an input terminal, a first output terminal and a second output terminal, wherein the processor has an initial mode, the initial mode is in one of a rotation speed control mode and a light emission control mode, the input terminal is configured to receive an input instruction, and the input instruction comprises a first characteristic;
a fan motor, electrically connected to the first output terminal; and
a light emitting element, electrically connected to the second output terminal;
wherein, when a value of the first characteristic is within a characteristic value range, the processor is switched from the initial mode to the other of the rotation speed control mode and the light emission control mode; when the value of the first characteristic is not within the characteristic value range and the initial mode is in the rotation speed control mode, the input terminal of the processor is electrically connected to the first output terminal; when the value of the first characteristic is not within the characteristic value range and the initial mode is in the light emission control mode, the input terminal of the processor is electrically connected to the second output terminal.

2. The fan device in claim 1, wherein the characteristic value range is from a lower limit to an upper limit, the first characteristic is in a frequency, the characteristic value range is in a frequency range, the lower limit is in a frequency lower limit, the upper limit is in a frequency upper limit, when a frequency of the input instruction is within the frequency range, the processor is switched from the initial mode to the other of the rotation speed control mode and the light emission control mode.

3. The fan device in claim 1, wherein the characteristic value range is from a lower limit to an upper limit, the first characteristic is in a voltage, the characteristic value range is in a voltage range, the lower limit is in a voltage lower limit, the upper limit is in a voltage upper limit; when a voltage of the input instruction is within the voltage range, the processor is switched from the initial mode to the other of the rotation speed control mode and the light emission control mode.

4. The fan device in claim 1, wherein the processor is a controller, the input terminal, the first output terminal, and the second output terminal are respectively disposed at the controller.

5. The fan device in claim 1, wherein the processor comprises a controller and a switch circuit, the input terminal and the first output terminal are disposed at the controller, the controller has a control terminal, the control terminal, the input terminal and the second output terminal are respectively connected to the switch circuit, when the processor is in the rotation speed control mode, the input terminal is electrically connected to the first output terminal and the switch circuit breaks a first electrical connection between the input terminal and the second output terminal, when the processor is in the light emission control mode, the switch circuit breaks a second electrical connection between the input terminal and the first output terminal and activates the first electrical connection.

6. A control method of a fan device, comprising:
receiving an input instruction via an input terminal of a processor, wherein the processor has an initial mode, the initial mode is in one of a rotation speed control mode and a light emission control mode, the input instruction comprises a first characteristic;
determining whether a value of the first characteristic is within a characteristic value range via the processor;
switching the processor from the initial mode to the other of the rotation speed control mode and the light emission control mode when the processor determines that the value of the first characteristic is within the characteristic value range;
maintaining the initial mode of the processor in the rotation speed control mode and outputting a rotation speed control signal of the input instruction to a fan motor when the processor determines that the value of the first characteristic is not within the characteristic value range and the initial mode is in the rotation speed control mode; and
maintaining the initial mode of the processor in the light emission control mode and outputting a light emission control signal of the input instruction to a light emitting element when the processor determines that the value of the first characteristic is not within the characteristic value range and the initial mode is in the light emission control mode.

7. The control method in claim 6, wherein the characteristic value range is from a lower limit to an upper limit, the first characteristic is in a frequency, the characteristic value range is in a frequency range, the lower limit is in a frequency lower limit, the upper limit is in a frequency upper limit, when a frequency of the input instruction is within the frequency range, the processor is switched from the initial mode to the other of the rotation speed control mode and the light emission control mode.

8. The control method in claim 6, wherein the characteristic value range is from a lower limit to an upper limit, the first characteristic is in a voltage, the characteristic value range is in a voltage range, the lower limit is in a voltage lower limit, the upper limit is in a voltage upper limit, when a voltage of the input instruction is within the voltage range, the processor is switched from the initial mode to the other of the rotation speed control mode and the light emission control mode.

9. The control method in claim 6, wherein the input instruction further comprises a second characteristic, the characteristic value range is from a lower limit to an upper limit, the first characteristic and the second characteristic are respectively in a frequency and in a duty ratio, the characteristic value range is in a frequency range, the lower limit is in a frequency lower limit, the upper limit is in a frequency upper limit; when the processor is in the rotation speed control mode, the duty ratio of the input instruction is proportional to a rotation speed of the fan motor, when the processor is in the light emission control mode, the duty ratio of the input instruction is proportional to a brightness of the light emitting element.

10. The control method in claim 6, wherein the characteristic value range is from a lower limit to an upper limit, the first characteristic is in a voltage, the characteristic value range is in a voltage range, the lower limit is in a voltage lower limit, the upper limit is in a voltage upper limit, when the processor is in the rotation speed control mode, a voltage of the input instruction is proportional to a rotation speed of the fan motor, when the processor is in the light emission control mode, the voltage of the input instruction is proportional to a brightness of the light emitting element.

11. The control method in claim 6, wherein the processor which is in the rotation speed control mode drives the fan motor to operate at a rotation speed, and the rotation speed of the fan motor is maintained when the processor is switched from the rotation speed control mode to the light emission control mode.

12. A fan system, comprising:
a motherboard, wherein the motherboard outputs an input instruction and the input instruction comprises a first characteristic;
a processor comprising an input terminal, a first output terminal and a second output terminal, wherein the input terminal receives the input instruction from the motherboard, the processor has an initial mode, the initial mode is in one of a rotation speed control mode and a light emission control mode;
a fan motor, electrically connected to the first output terminal;
a light emitting element, electrically connected to the second output terminal;
wherein the processor is switched from the initial mode to the other of the rotation speed control mode and the light emission control mode when a value of the first characteristic is within a characteristic value range; the input terminal of the processor is electrically connected to the first output terminal when the value of the first characteristic is not within the characteristic value range and the initial mode is in the rotation speed control mode; the input terminal of the processor is electrically connected to the second output terminal when the value of the first characteristic is not within the characteristic value range and the initial mode is in the light emission control mode.

13. The fan system in claim 12, wherein the characteristic value range is from a lower limit to an upper limit, the first characteristic is in a frequency, the characteristic value range is in a frequency range, the lower limit is in a frequency lower limit, the upper limit is in a frequency upper limit, when a frequency of the input instruction is within the frequency range, the processor is switched from the initial mode to the other of the rotation speed control mode and the light emission control mode.

14. The fan system in claim 12, wherein the characteristic value range is from a lower limit to an upper limit, the first characteristic is in a voltage, the characteristic value range is in a voltage range, the lower limit is in a voltage lower limit, the upper limit is in a voltage upper limit, when a voltage of the input instruction is within the voltage range, the processor is switched from the initial mode to the other of the rotation speed control mode and the light emission control mode.

15. A control method of a fan system, comprising:
outputting an input instruction via a motherboard, wherein the input instruction comprises a first characteristic;
receiving the input instruction via an input terminal of a processor, wherein the processor has an initial mode, the initial mode is in one of a rotation speed control mode and a light emission control mode, the input instruction comprises a first characteristic;
determining whether a value of the first characteristic is within a characteristic value range via the processor;
switching the processor from the initial mode to the other of the rotation speed control mode and the light emission control mode when the processor determines that the value of the first characteristic is within the characteristic value range;
maintaining the initial mode of the processor in the rotation speed control mode and outputting a rotation speed control signal of the input instruction to a fan motor when the processor determines that the value of the first characteristic is not within the characteristic value range and the initial mode is in the rotation speed control mode; and
maintaining the initial mode of the processor in the light emission control mode and outputting a light emission control signal of the input instruction to a light emitting element when the processor determines that the value of the first characteristic is not within the characteristic value range and the initial mode is in the light emission control mode.

16. The control method in claim 15, wherein the characteristic value range is from a lower limit to an upper limit, the first characteristic is in a frequency, the characteristic value range is in a frequency range, the lower limit is in a frequency lower limit, the upper limit is in a frequency upper limit, when a frequency of the input instruction is within the frequency range, the processor is switched from the initial mode to the other of the rotation speed control mode and the light emission control mode.

17. The control method in claim 15, wherein the characteristic value range is from a lower limit to an upper limit, the first characteristic is in a voltage, the characteristic value range is in a voltage range, the lower limit is in a voltage lower limit, the upper limit is in a voltage upper limit, when a voltage of the input instruction is within the voltage range, the processor is switched from the initial mode to the other of the rotation speed control mode and the light emission control mode.

18. The control method in claim 15, wherein the input instruction further comprises a second characteristic, the characteristic value range is from a lower limit to an upper limit, the first characteristic and the second characteristic are respectively in a frequency and in a duty ratio, the characteristic value range is in a frequency range, the lower limit is in a frequency lower limit, the upper limit is in a frequency upper limit; when the processor is in the rotation speed control mode, a duty ratio of the input instruction is proportional to a rotation speed of the fan motor, when the processor is in the light emission control mode, the duty ratio of the input instruction is proportional to a brightness of the light emitting element.

19. The control method in claim 15, wherein the characteristic value range is from a lower limit to an upper limit, the first characteristic is in a voltage, the characteristic value range is in a voltage range, the lower limit is in a voltage lower limit, the upper limit is in a voltage upper limit, when the processor is in the rotation speed control mode, a voltage of the input instruction is proportional to a rotation speed of the fan motor, when the processor is in the light emission control mode, the voltage of the input instruction is proportional to a brightness of the light emitting element.

20. The control method in claim 15, wherein the processor which is in the rotation speed control mode drives the fan motor to operate at a rotation speed, and the rotation speed of the fan motor is maintained when the processor is switched from the rotation speed control mode to the light emission control mode.

21. The control method in claim 15, further comprising: via a third terminal of the processor, at least transmitting a current rotation speed of the fan motor, a service life of the fan motor, and a service life of the processor to the motherboard.

* * * * *